US012707306B2

(12) United States Patent
Lee et al.

(10) Patent No.: US 12,707,306 B2
(45) Date of Patent: Aug. 11, 2026

(54) ELECTRONIC DEVICE FOR MEASURING COMMUNICATION SIGNAL FROM OUTSIDE AND METHOD FOR OPERATING THE SAME

(71) Applicant: Samsung Electronics Co., Ltd., Suwon-si (KR)

(72) Inventors: Keonyoung Lee, Suwon-si (KR); Hyeonsoo Kim, Suwon-si (KR); Chansoo Park, Suwon-si (KR); Jaehyun Sim, Suwon-si (KR); Jiwon Choi, Suwon-si (KR); Gwanghyun Gho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 17/017,623

(22) Filed: Sep. 10, 2020

(65) Prior Publication Data

US 2021/0306889 A1 Sep. 30, 2021

(30) Foreign Application Priority Data

Mar. 25, 2020 (KR) ........................ 10-2020-0036489

(51) Int. Cl.
*H04W 24/10* (2009.01)
*H04B 1/10* (2006.01)
(Continued)

(52) U.S. Cl.
CPC .............. *H04W 24/10* (2013.01); *H04B 1/44* (2013.01); *H04W 72/0453* (2013.01);
(Continued)

(58) Field of Classification Search
CPC ..... H04W 24/10; H04W 76/16; H04W 76/27; H04W 72/0453; H04B 1/44
See application file for complete search history.

(56) References Cited

U.S. PATENT DOCUMENTS 8,649,790 B2 2/2014 Kazmi
2009/0059871 A1 3/2009 Nader et al.
(Continued)

FOREIGN PATENT DOCUMENTS

CN 104541538 A 4/2015
CN 105144614 A 12/2015
(Continued)

OTHER PUBLICATIONS

International Search Report dated Dec. 14, 2020 in connection with International Patent Application No. PCT/KR2020/012242, 3 pages.
(Continued)

*Primary Examiner* — Noel R Beharry

(57) ABSTRACT

An electronic device comprises a processor and an antenna configured to transmit or receive at least one communication signal associated with at least one communication scheme. The processor is configured to form a connection with a serving cell, obtain first information associated with a measurement period of a first communication signal associated with a first communication scheme and second information associated with reporting a measurement result of the first communication signal, determine the measurement period of the first communication signal based on the first information, when the determined measurement period is larger than, or identical to, a time-to-trigger value, adjust the determined measurement period, and measure the first communication signal based on the adjusted measurement period, and report a result of the measurement to the serving cell, based on the at least one reporting criteria being met, until the timer corresponding to the time-to-trigger value expires.

14 Claims, 14 Drawing Sheets

(51) Int. Cl.
*H04B 1/44* (2006.01)
*H04W 72/0453* (2023.01)
*H04W 76/16* (2018.01)
*H04W 76/27* (2018.01)

(52) U.S. Cl.
CPC .......... *H04W 76/16* (2018.02); *H04W 76/27* (2018.02); *H04B 1/1027* (2013.01)

(56) References Cited

U.S. PATENT DOCUMENTS

2014/0248840 A1 9/2014 Karri et al.
2015/0189571 A1 7/2015 Futaki
2015/0264592 A1 9/2015 Novlan et al.
2015/0319666 A1* 11/2015 Kang .................... H04W 72/20 370/332
2016/0205601 A1* 7/2016 Yiu ................... H04W 72/0466 455/444
2017/0026861 A1 1/2017 Tseng et al.
2018/0132125 A1 5/2018 Li et al.
2018/0132158 A1* 5/2018 Tseng .................... H04W 76/27
2018/0227824 A1 8/2018 Chen et al.
2019/0150014 A1 5/2019 Virtej et al.
2019/0174341 A1* 6/2019 Chincholi ......... H04W 36/0088
2019/0174349 A1 6/2019 Sun et al.
2019/0223065 A1* 7/2019 Lu ..................... H04W 36/0072
2019/0313314 A1* 10/2019 Yang ..................... H04W 24/10
2019/0364469 A1 11/2019 Siomina
2020/0015135 A1* 1/2020 Ericson ............. H04W 36/0094
2020/0052803 A1* 2/2020 Deenoo ................. H04W 48/12
2020/0137601 A1 4/2020 Siomina et al.
2020/0187035 A1 6/2020 Maattanen
2020/0229002 A1* 7/2020 Kaikkonen ......... H04W 56/001
2021/0176682 A1* 6/2021 Guo ................ H04W 36/00837
2021/0314828 A1* 10/2021 Kim .................. H04W 36/0058
2022/0038929 A1* 2/2022 Tsuboi .................. H04W 76/15

FOREIGN PATENT DOCUMENTS

CN 110663269 A 1/2020
EP 3160181 A1 4/2017
WO WO-2019162904 A1 * 8/2019 ........ H04W 35/0085

OTHER PUBLICATIONS

Written Opinion of the International Searching Authority dated Dec. 14, 2020 in connection with International Patent Application No. PCT/KR2020/012242, 7 pages.
Supplementary European Search Report dated Jul. 18, 2023, in connection with European Application No. 20926398.7, 9 pages.
Notification of the Decision to Grant a Patent Right for a Patent for Invention dated Oct. 31, 2024, in connection with Chinese Application No. 202080099112.0, 14 pages.
Communication pursuant to Article 94(3) EPC dated May 16, 2025, in connection with European Application No. 20926398.7, 12 pages.
The First Office Action dated May 22, 2024, in connection with Chinese Application No. 202080099112.0, 20 pages.
Request for the Submission of an Opinion dated Jul. 31, 2024, in connection with Korean Application No. 10-2020-0036489, 13 pages.

* cited by examiner

ELECTRONIC DEVICE FOR MEASURING COMMUNICATION SIGNAL FROM OUTSIDE AND METHOD FOR OPERATING THE SAME

CROSS-REFERENCE TO RELATED APPLICATION

This application is based on and claims priority under 35 U.S.C. 119 to Korean Patent Application No. 10-2020-0036489 filed on Mar. 25, 2020 in the Korean Intellectual Property Office, the disclosure of which is herein incorporated by reference in its entirety.

BACKGROUND

1. Field

Various embodiments of the disclosure relate to electronic devices for measuring communication signals from the outside and methods for operating the same.

2. Description of Related Art

As mobile communication technology evolves, multi-functional portable terminals are commonplace and, to meet increasing demand for radio traffic, vigorous efforts are underway to develop 5G communication systems. To achieve a higher data transmission rate, a higher frequency band (e.g., a band exceeding 6 GHz) in addition to the frequency band (such as of 6 GHz or less) which is adopted for 3G and LTE is considered for 5G communication systems to enable quicker data transmission.

In 3rd generation partnership project (3GPP) long term evolution (LTE) communication or 5G communication, a user equipment (UE) may receive a message (e.g., an RRCConnectionReconfiguration or RRCReconfiguration message) to report at least one parameter corresponding to a neighbor cell from a master node. The UE may measure at least one parameter of a signal from the base station of the neighbor cell and report it to the master node. The master node may perform a hand-over procedure based on the result of the reporting or determine to add the neighbor base station as a secondary node (SN).

The UE may be configured to measure communication signals from the outside (e.g., the neighbor cell) not constantly but at regular periods. Further, the UE may receive reporting criteria (e.g., at least one or more of a triggering event and a time-to-trigger) for performing reporting. The reporting criteria are conditions indicating whether to report the result (e.g., at least one of reference signal received power (RSRP), received signal strength indicator (RSSI), or reference signal received quality (RSRQ)) of measurement of the communication signal (e.g., at least one of a reference signal, synchronization signal, or channel state information) from a specific cell. The reporting criterion may also be referred to as a triggering event. Time-to-trigger may mean a period during which a reporting criterion (e.g., a triggering event) needs to be met to trigger measurement reporting.

As discussed above, the UE may identify the time-to-trigger and measurement period. The measurement period may be identical to or longer than the time-to-trigger. When the measurement period is identical to or longer than the time-to-trigger, the UE may identify that the first measurement result meets the reporting criterion and then wait until the time-to-trigger timer expires, then report the result of the measurement to the network. The unnecessary wait for the expiration of the time-to-trigger timer may complicate a real-time reporting of the channel environment.

The above information is presented as background information only to assist with an understanding of the disclosure. No determination has been made, and no assertion is made, as to whether any of the above might be applicable as prior art with regard to the disclosure.

SUMMARY

According to various embodiments, an electronic device and method for operating the electronic device may immediately report the result of measurement or adjust the period of measurement as the reporting criterion is met when the measurement period is identical to or longer than the time-to-trigger.

In accordance with various embodiments, an electronic device comprises at least one processor configured to support at least one communication scheme and at least one antenna configured to transmit or receive at least one communication signal associated with the at least one communication scheme, wherein the at least one processor is configured to form a connection with a serving cell, obtain first information associated with a measurement period of a first communication signal associated with a first communication scheme among the at least one communication scheme, received via at least some of the at least one antenna and second information associated with reporting a measurement result of the first communication signal, determine the measurement period of the first communication signal based on the first information, when the determined measurement period is larger than, or identical to, a time-to-trigger value included in the second information, adjust the determined measurement period, based on a first measurement value for the first communication signal meeting at least one reporting criterion included in the second information, and measure the first communication signal based on the adjusted measurement period while a timer corresponding to the time-to-trigger value operates, and report a result of the measurement of the first communication signal to the serving cell, based on the at least one reporting criteria being met by at least one measurement value for the first communication signal measured according to the adjusted measurement period, until the timer corresponding to the time-to-trigger value expires.

In accordance with various embodiments, a method for operating an electronic device including at least one processor configured to support at least one communication scheme and at least one antenna configured to transmit or receive at least one communication signal associated with the at least one communication scheme comprises forming a connection with a serving cell, obtaining first information associated with a measurement period of a first communication signal associated with a first communication scheme among the at least one communication scheme, received via at least some of the at least one antenna and second information associated with reporting a measurement result of the first communication signal, determining the measurement period of the first communication signal based on the first information, when the determined measurement period is larger than, or identical to, a time-to-trigger value included in the second information, adjusting the determined measurement period, based on a first measurement value for the first communication signal meeting at least one reporting criterion included in the second information, and measuring the first communication signal based on the adjusted measurement period while a timer corresponding to the timeto-trigger value operates, and reporting a result of the measurement of the first communication signal to the serving cell, based on the at least one reporting criteria being met by at least one measurement value for the first communication signal measured according to the adjusted measurement period, until the timer corresponding to the time-to-trigger value expires.

In accordance with various embodiments, an electronic device comprises at least one processor configured to support at least one communication scheme and at least one antenna configured to transmit or receive at least one communication signal associated with the at least one communication scheme, wherein the at least one processor is configured to form a connection with a serving cell, obtain first information associated with a measurement period of a first communication signal associated with a first communication scheme among the at least one communication scheme, received via at least some of the at least one antenna and second information associated with reporting a measurement result of the first communication signal, determine the measurement period of the first communication signal based on the first information, when the determined measurement period is larger than, or identical to, a time-to-trigger value included in the second information, based on a first measurement value for the first communication signal meeting at least one reporting criterion included in the second information, report a measurement result of the first communication signal based on the first measurement value to the serving cell.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
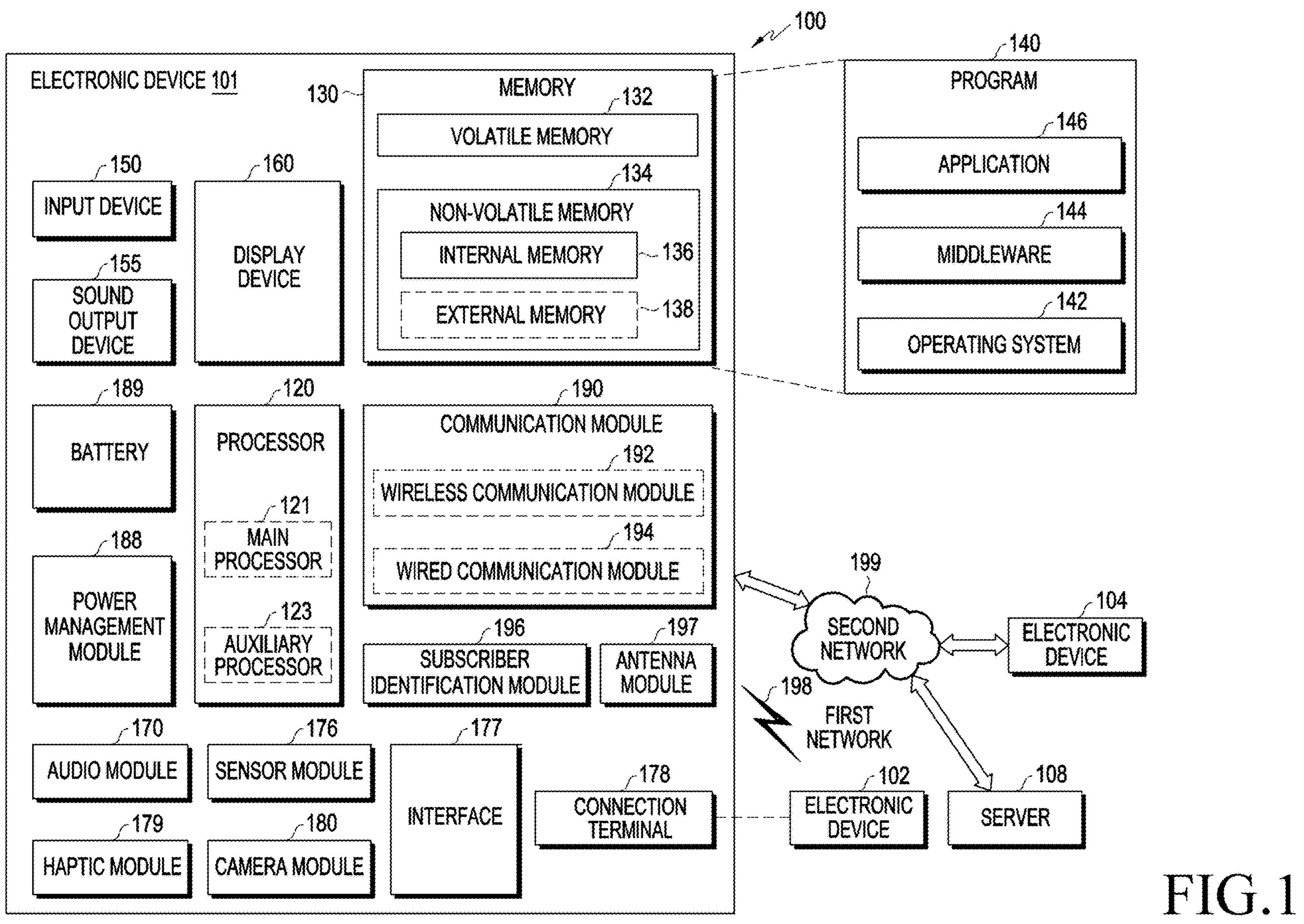
FIG. 1 illustrates a view of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include one or more antennas. In this case, at least one antenna appropriate for a communication scheme used in a communication network, such as the first network 198 or the second network 199, may be selected from the one or more antenna by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
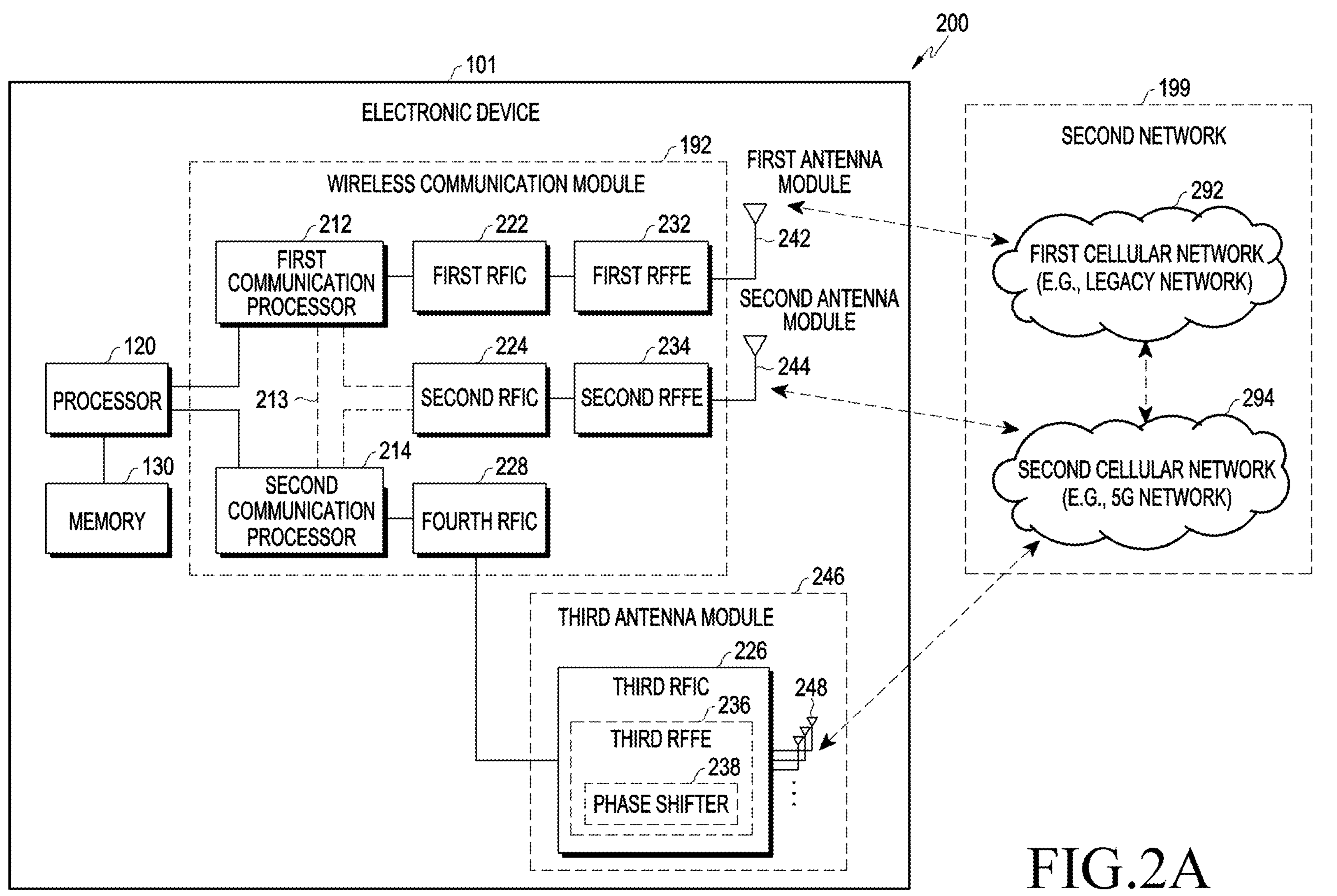
FIG. 2A illustrates a block diagram of an electronic device for supporting network communication and 5G network communication according to an embodiment.

FIG. 2A illustrates a block diagram 200 of an electronic device 101 for supporting network communication and 5G network communication according to an embodiment. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The network 199 may include a first network 292 and a second network 294. According to an embodiment, the electronic device 101 may further include at least one component among the components of FIG. 1, and the network 199 may further include at least one other network. According to an embodiment, the first communication processor (CP) 212, the second CP 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first CP 212 may establish a communication channel of a band that is to be used for wireless communication with the first network 292 or may support legacy network communication via the established communication channel.

According to an embodiment, the first network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second network 294 or may support fifth generation (5G) network communication via the established communication channel. According to an embodiment, the second network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214.

For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an US-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
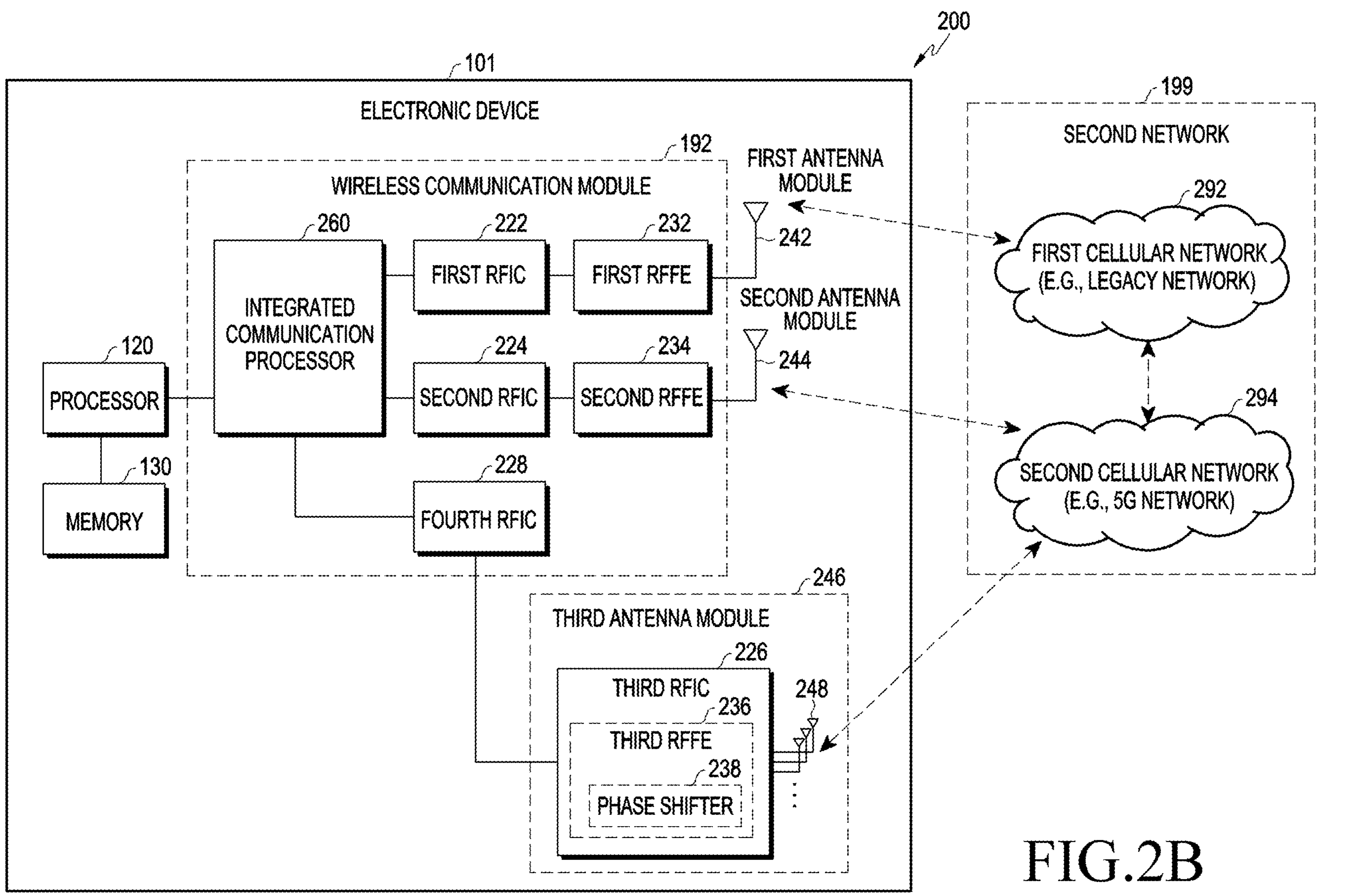
FIG. 2B illustrates a block diagram of an electronic device for supporting network communication and 5G network communication according to an embodiment.

According to an embodiment, the first CP 212 and the second CP 214 may be implemented in a single chip or a single package. According to an embodiment, the first CP 212 or the second CP 214, along with the processor 120, an assistance processor 123, or communication module 190, may be formed in a single chip or single package. For example, as shown in FIG. 2B, an integrated communication processor 260 may support all of the functions for communication with the first cellular network and the second cellular network.

Upon transmission, the first RFIC 222 may convert a baseband signal generated by the first CP 212 into a radio frequency (RF) signal with a frequency ranging from about 700 MHz to about 3 GHz which is used by the first network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first CP 212.

Upon transmission, the second RFIC 224 may convert the baseband signal generated by the first CP 212 or the second CP 214 into a Sub6-band (e.g., about 6 GHz or less) RF signal (hereinafter, "5G Sub6 RF signal") that is used by the second network 294 (e.g., a 5G network). Upon receipt, the 5G Sub6 RF signal may be obtained from the second network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first CP 212 and the second CP 214.

The third RFIC 226 may convert the baseband signal generated by the second CP 214 into a 5G Above6 band (e.g., from about 6 GHz to about 60 GHz) RF signal (hereinafter, "5G Above6 RF signal") that is to be used by the second network 294 (e.g., a 5G network). Upon receipt, the 5G Above6 RF signal may be obtained from the second network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second CP 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second CP 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second network 294 (e.g., a 5G network) through an antenna (e.g., the antenna 248) and be converted into an IF signal by the third RFIC 226. The fourth RFIC 228 may convert the IF signal into a baseband signal that may be processed by the second CP 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second network 294 (e.g., a 5G network) may be operated independently (e.g., as standalone (SA)) from, or in connection (e.g., as non-standalone (NSA)) with the first network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first CP 212, or the second CP 214).

Although FIGS. 2A and 2B illustrate an example in which the processor 120 is separated from the first communication processor 212, the second communication processor 214, or the integrated communication processor 260, this is merely an example. According to an embodiment, the electronic device 101 may include an integrated system on chip (SoC) that supports all of the function of the processor 120, the function for the first network communication of the first communication processor 212, and the function for the second network communication of the second communication processor 214. It will be easily appreciated by one of ordinary skill in the art that the operations of the processor 120, the first communication processor 212, or the second communication processor 214 as described herein may be performed by the integrated SoC.

Although not shown, embodiments of the disclosure may also be applied to the electronic device 101 supporting LTE communication alone. In this case, the electronic device 101 may be implemented to include the processor 120 and/or the first communication processor 212, the first RFIC 222, the first RFFE 232, and the first antenna module 242, but not to include the components (e.g., at least one of the second RFIC 224, the second RFFE 234, the second antenna module 244, the second communication processor 214, the fourth RFIC 228, and the third antenna module 246) associated with 5G communication.

Figure 3A:
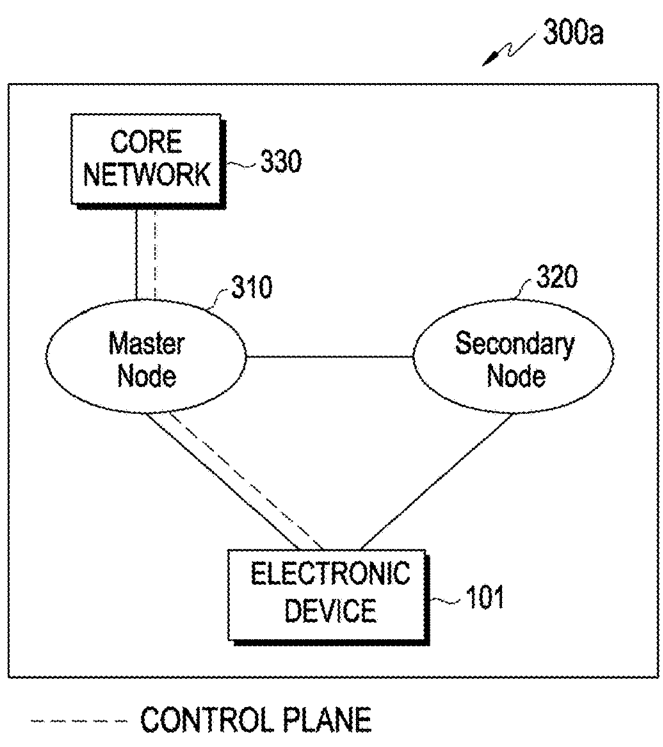
FIG. 3A illustrates a view of wireless communication systems providing a legacy communication network and/or a 5G communication network according to embodiments.
Figure 3B:
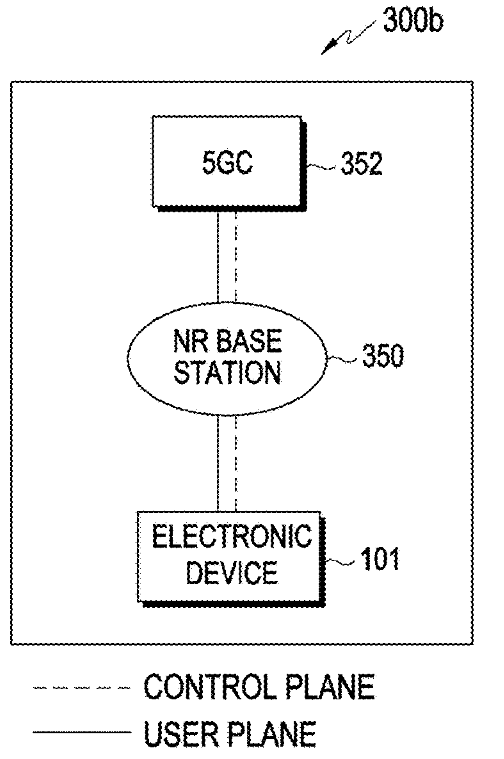
FIG. 3B illustrates a view of wireless communication systems providing a legacy communication network and/or a 5G communication network according to embodiments.
Figure 3C:
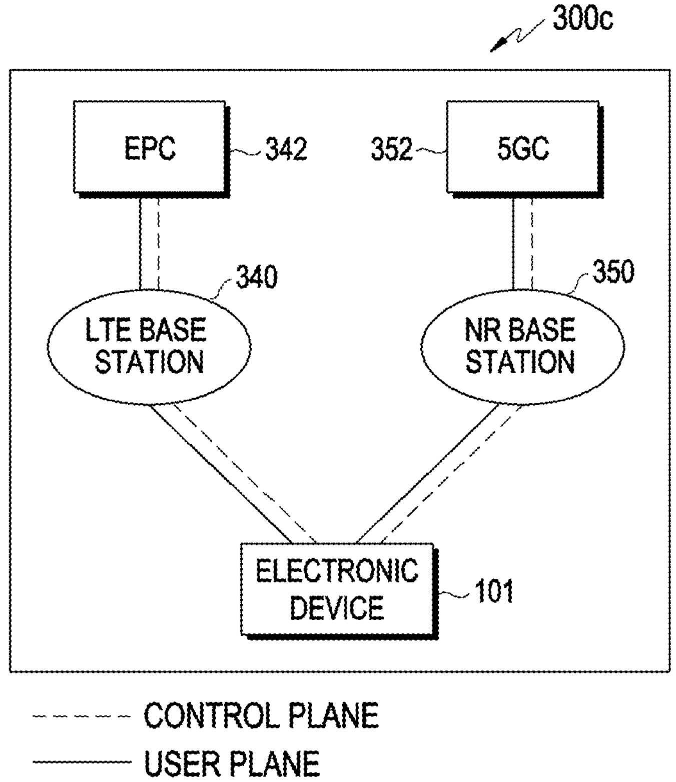
FIG. 3C illustrates a view of wireless communication systems providing a legacy communication network and/or a 5G communication network according to embodiments.

FIGS. 3A, 3B, and 3C are views illustrating wireless communication systems providing a legacy communication network and/or a 5G communication network according to embodiments. Referring to FIGS. 3A to 3C, the network environment 301*a* to 300*c* may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., a new radio (NR) base station 350 (e.g., a gNodeB (gNB)) that supports radio access with the electronic device 101 and a 5th generation core (5GC) 352 that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 330 (e.g., the EPC 342).

Referring to FIG. 3A, according to an embodiment, the electronic device 101 may transmit or receive at least one of a control message or user data to/from at least part (e.g., the NR base station 350 or 5GC 352) of the 5G network via at least part (e.g., the LTE base station 340 or EPC 342) of the legacy network.

According to an embodiment, the network environment 300*a* may include a network environment that provides wireless communication dual connectivity (DC) to the LTE base station 340 and the NR base station 350 and transmits or receives control messages to/from the electronic device 101 via one core network 330 of the EPC 342 or the 5GC 352.

According to an embodiment, in the DC environment, one of the LTE base station 340 or the NR base station 350 may operate as a master node (MN) 310, and the other as a secondary node (SN) 320. The MN 310 may be connected with the core network 330 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station 340, the SN 320 may include the NR base station 350, and the core network 330 may include the EPC 342. For example, control messages may be transmitted/received via the LTE base station 340 and the EPC 342, and user data may be transmitted/received via at least one of the LTE base station 340 or the NR base station 350.

According to an embodiment, the MN 310 may include the NR base station 350, and the SN 320 may include the LTE base station 340, and the core network 330 may include the 5GC 352. For example, control messages may be transmitted/received via the NR base station 350 and the 5GC 352, and user data may be transmitted/received via at least one of the LTE base station 340 or the NR base station 350.

Referring to FIG. 3B, according to an embodiment, the 5G network 300*b* may include the NR base station 350 and the 5GC 352 and transmit or receive control messages and user data independently from the electronic device 101. Although not shown, the electronic device 101 may be connected to a core network (e.g., the EPC 342) via the LTE base station 340 (e.g., an eNB). Embodiments of the disclosure may be applicable to the electronic device 101 which supports LTE communication alone.

Referring to FIG. 3C, according to an embodiment, the legacy network and the 5G network each may provide data transmission/reception independently. For example, the electronic device 101 and the EPC 342 may transmit or receive control messages and user data via the LTE base station 340. As another example, the electronic device 101 and the 5GC 352 may transmit or receive control messages and user data via the NR base station 350.

According to an embodiment, the electronic device 101 may be registered in at least one of the EPC 342 or the 5GC 352 to transmit or receive control messages.

According to an embodiment, the EPC 342 or the 5GC 352 may interwork with each other to manage communication for the electronic device 101. For example, mobility information for the electronic device 101 may be transmitted or received via the interface between the EPC 342 and the 5GC 352.

As set forth above, dual connectivity via the LTE base station 340 and the NR base station 350 may be referred to as E-UTRA new radio dual connectivity (EN-DC).

Figure 4A:
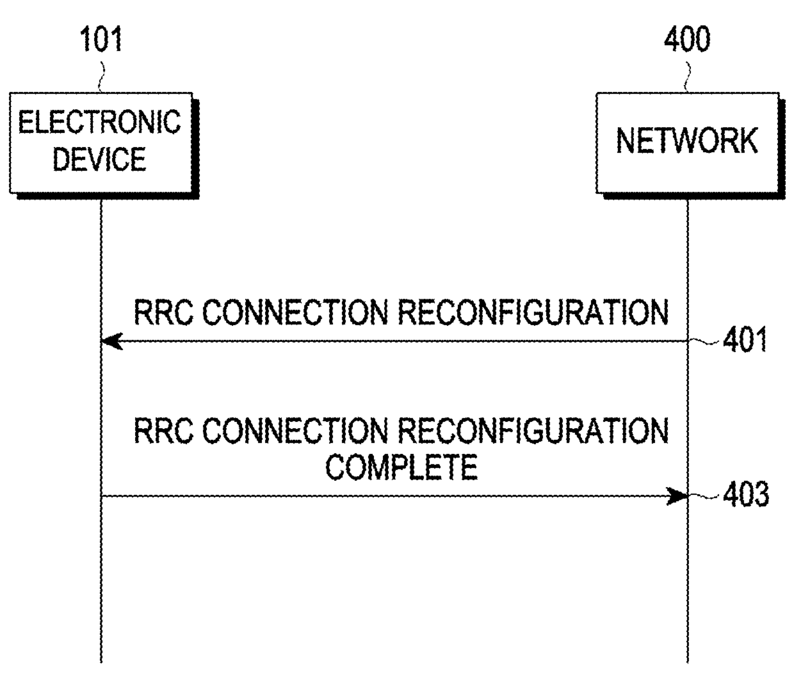
FIG. 4A illustrates a flowchart of operations of an electronic device and a network according to an embodiment.

FIG. 4A illustrates a flowchart of operations of an electronic device and a network according to an embodiment.

According to an embodiment, in operation 401, an electronic device 101 (e.g., at least one of the processor 120, the first communication processor 212, the second communication processor 214, the integrated communication processor 260, or the integrated SoC (not shown)) may receive an RRC connection reconfiguration (or RRC reconfiguration) message from the network 400. The electronic device 101 may reconfigure the RRC connection based on the RRC connection reconfiguration message. In this disclosure, the RRC connection reconfiguration message may include any one of an RRC connection reconfiguration message or an RRC reconfiguration message. The electronic device 101 may form an RRC connection with, e.g., the network 400 and may then receive an RRC connection reconfiguration message. In operation 403, the electronic device 101 may transmit an RRC connection reconfiguration complete message, which indicates that the reconfiguration is complete, to the network 400. The network 400 may be a base station (e.g., at least one of an eNB, a gNB, an ng-eNB, or an en-gNB) corresponding to the communication for configuring the RRC connection reconfiguration message but, if some of the functions of the base station are virtualized, the network 400 may be implemented as at least part of a server for performing the virtualized functions and hardware for radio control. The network 400 may be referred to as a serving cell.

According to an embodiment, the process of the RRC connection reconfiguration may be one for reconfiguring the RRC connection (e.g., configuring, adjusting, and/or releasing a resource block (RB)) and synchronization and reconfiguration, setting up, adjusting, and/or releasing measurement, and adding, adjusting, and/or releasing an SCell. As part of the RRC connection reconfiguration process, NAS dedicated information may be transmitted from the network 400 to the electronic device 101. When the electronic device 101 is in, e.g., an RRC connected state (RRC_CONNECTED state), the network 400 may perform an RRC connection reconfiguration procedure. For example, if the RRC connection reconfiguration message includes a measurement configuration (e.g., measConfig of 3GPP TS 38.331 or 36.331), the electronic device 101 may perform a measurement configuration procedure (e.g., the measurement configuration procedure set forth in 3GPP TS 38.331 or 36.331).

As described above, according to an embodiment, the network 400 may be configured to allow the electronic device 101 to perform measurement and reporting according to the measurement configuration. The measurement configuration may be provided via UE dedicated RRC signaling, e.g., an RRC connection reconfiguration message. For example, if the electronic device 101 performs 3GPP LTE communication with the network 400 or communication for control of dual connectivity is set to 3GPP LTE communication, the electronic device 101 may be requested to perform the following types of communication:

intra-frequency measurement: measurement at downlink carrier frequency(ies) of serving cell(s)

inter-frequency measurement: measurement at frequencies different from any frequency among downlink carrier frequency(ies) of serving cell(s)

measurement at the frequencies of inter-RAT (e.g., NR, UTRA, GERAN, CDMA 2000 HRPD or CDMA 2000 1×RTT)

For example, if the electronic device 101 performs 5G communication with the network 400 or communication for control of dual connectivity is set to 5G communication, the following types of measurement may be performed.

As NR measurement, e.g., intra-frequency measurement and/or inter-frequency measurement in NR inter-RAT measurement at E-UTRA frequencies The measurement configuration may include information about the measurement object. The measurement object may include, e.g., the subcarrier spacing and frequency/time positions of the reference signal to be measured. The electronic device 101 may identify the frequency for measurement based on the measurement object in the measurement configuration. The measurement object may include a measurement object identity (e.g., ARFCN-ValueEUTRA and/or ARFCN-ValueNR), which is information indicating the frequency to be measured, or a cell blacklist and/or a cell whitelist.

According to an embodiment, the measurement configuration of the RRC connection reconfiguration message may include a reporting configuration. For example, the reporting configuration may include at least one of a reporting criterion, a reporting format, or an RS type, but not limited thereto. The reporting criterion is a condition to trigger the UE to transmit a measurement report and may be a periodic or single event description. For, e.g., LTE communication, the reporting format may be information about quantity and relevant information (e.g., the number of cells to be reported) that the UE includes in the measurement report. For, e.g., 5G communication, the reporting format may be per-cell and per-beam quantity and other related information (e.g., the maximum per-cell number and the maximum number of cells to be reported) that is to be included in the measurement report. The RS type may denote, e.g., the RS of the beam to be used by the UE and the measurement result.

According to an embodiment, the measurement configuration of the RRC connection reconfiguration message may include at least one of measurement identity, quantity configuration, or measurement gap. The measurement identity may be a list of measurement identities associated with the measurement object. The quantity configuration may define a measurement filtering configuration and periodic reporting of measurement used in all event evaluation and related reporting. The measurement gap may be the period when the UE perform measurement, e.g., an interval during which uplink or downlink transmission is not scheduled.

Figure 4B:
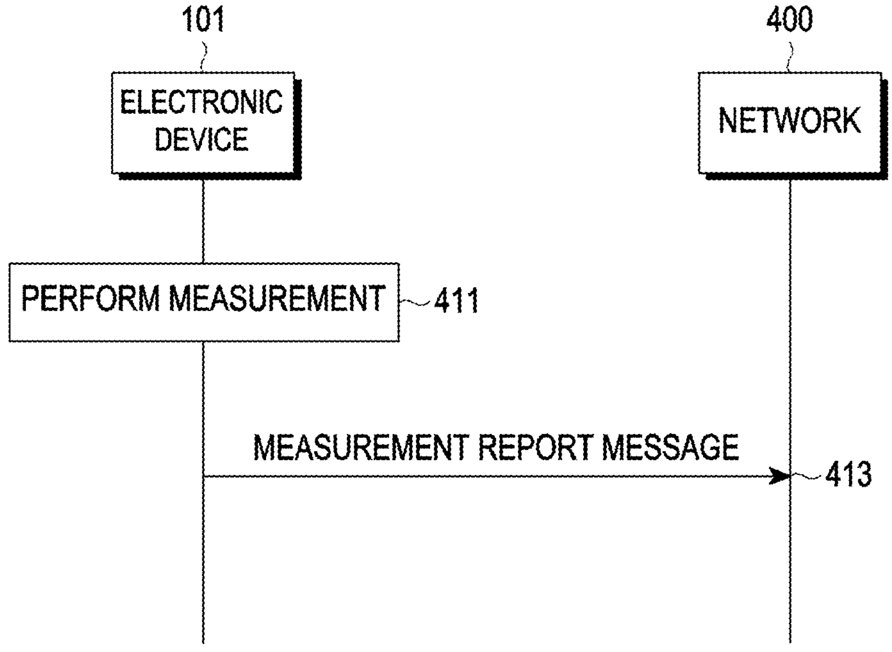
FIG. 4B illustrates a flowchart of operations of an electronic device according to an embodiment.

FIG. 4B illustrates a flowchart of operations of an electronic device according to an embodiment.

According to an embodiment, in operation 411, an RRC-connected electronic device 101 may perform measurement. For example, the electronic device 101 may perform measurement on at least one of the RSRP, RSRQ, RSSI, or SINR corresponding to at least one of inter-frequency, intra-frequency, or inter-RAT based on the measurement configuration corresponding to each serving cell. In the disclosure, "electronic device 101 performs measurement on a communication signal" may mean that the electronic device 101 performs measurement on at least one of the RSRP, RSRQ, RSSI, or SINR at a reference point by a communication signal from the outside.

According to an embodiment, "electronic device 101 performs RSRP measurement" may mean that at least one of the processor 120, the first communication processor 212, the second communication processor 214, the integrated communication processor 260, or the integrated SoC (not shown) identifies the RSRP measurements, but not limited thereto. For example, the electronic device 101 may identify the linear average of power distributions (in watts (W)) of the resource element carrying at least one of the reference signal or synchronization signal in the frequency bandwidth to be measured, as the RSRP measurement. Meanwhile, the reference signal and the synchronization signal are not limited to specific signals but may be any signal defined in the 3GPP. For example, the electronic device 101 may identify the RSRP measurement based on the linear average of the power distributions at the reference point. For example, in the case of LTE communication, the electronic device 101 may identify the RSPR measurement based on the linear average of the power distributions at the antenna connector of the antenna (e.g., the first antenna module 242) receiving the communication signal. For example, in the case of FR1 of NR, the electronic device 101 may identify the RSPR measurement based on the linear average of the power distributions at the antenna connector of the antenna (e.g., the first antenna module 242) receiving the communication signal. For example, in the case of FR2 of NR, the electronic device 101 may identify a measurement (e.g., a synchronization signal-reference signal received power (SS-RSRP)) based on a combined signal from the antenna element (e.g., at least one antenna element of the antenna 248) corresponding to a given receiver branch.

Although not shown, the electronic device 101 may include at least one sensor (e.g., at least one of a voltage sensor, a current sensor, or a power sensor) capable of measuring the power at the reference point (e.g., the antenna connector) and measure the power at the reference point based on the sensing data from at least one sensor. As described above, since the reference point is not limited to a specific one, no restriction is imposed on the position where at least one sensor is connected.

According to an embodiment, "electronic device 101 performs RSRQ measurement" may mean that at least one of the processor 120, the first communication processor 212, the second communication processor 214, the integrated communication processor 260, or the integrated SoC (not shown) identifies the RSRQ measurements, but not limited thereto. For example, the electronic device 101 may perform RSRQ measurement based on Equation 1.

$$RSRQ = N \times RSRP/RSSI \quad \text{[Equation 1]}$$

RSSI is the RSSI of the carrier and may mean the linear average of all the received power values observed at a specific OFDM symbol of the measurement subframe in the measurement bandwidth for, e.g., N resource blocks and may include the interference and heat noise from the adjacent channel. N may be the number of the resource blocks. The electronic device 101 may measure the RSSI and RSRP and identify the RSRQ from the RSSI and RSRP measurements. Or, the electronic device 101 may measure the SINR based on the signal power of the serving cell relative to the noise, with respect to the RS and PDSCH power of the serving cell.

By the above-described operations, the electronic device 101 may identify the measurement result from the, e.g., the physical layer, and the electronic device 101 may determine whether the reporting criterion is met based on the measurement result. The electronic device 101 may perform filtering (e.g., layer 3 filtering) on the result and determine whether the reporting criterion is met based on the result of the filtering. Equation 2 represents the layer 3 filtering process.

$$F_n = (1-a)*F_{n-1} + a*M_n \quad \text{[Equation 2]}$$

$M_n$ may be the latest measurement result (e.g., RSRP and/or RSRQ) received from the physical layer. $F_n$ may be the updated filtered measurement result and may be used for measurement reporting or reporting criterion evaluation. $F_{n-1}$ may be the existing filtered measurement result. When the first measurement result is received from the physical layer, $F_0$ may be set to $M_1$. a may be $½^{(ki/4)}$, where ki may be the filtering coefficient corresponding to the measurement quantity of the ith quantity configuration in the quantity configuration list, and i may be the quantity configuration index of the measurement object. According to an embodiment, "measurement result" may denote at least one of, e.g., a value obtained from the physical layer or a value resultant from filtering the value obtained from the physical layer.

According to an embodiment, the electronic device 101 may determine whether the measurement result meets the reporting criteria. The reporting criteria may include, but is not limited to, the following:

Event A1: Serving becomes better than threshold

Event A2: Serving becomes worse than threshold

Event A3: Neighbor becomes offset better than PCell/PSCell (or SpCell of NR)

Event A4: Neighbor becomes worse than threshold

Event A5: PCell/PSCell (or, SpCell of NR) becomes worse than threshold1 and neighbor (or neighbor/SCell of NR) becomes better than threshold2

Event A6: neighbor becomes offset better than SCell (or SCell of NR)

Event B1: Inter RAT neighbor becomes better than threshold

Event B2: PCell becomes worse than threshold1 and inter RAT neighbor becomes better than threshold2

The above-enumerated reporting criteria may follow, e.g., 3GPP TS 36.331 or 3GPP TS 38.331 but is not limited to a specific kind.

According to an embodiment, the electronic device 101 may perform the measurement, which needs to be performed by the measurement configuration, not constantly but at measurement periods.

According to an embodiment, based on meeting the reporting criteria, the electronic device 101 may transmit a measurement report message to the network 400 (e.g., the serving cell) in operation 413. For example, if the met reporting criterion among the above-described reporting criteria is maintained while the timer corresponding to the time-to-trigger value operates (e.g., before the timer expires), the electronic device 101 may transmit a measurement report message to the network 400. For the measurement reporting process-triggered measurement identity, the electronic device 101 may configure the measurement result (e.g., measResults of 3GPP TS 38.331 or 3GPP TS 36.331) in the measurement report message. The information element (IE) of the measurement result may include the measurement result (e.g., at least one of RSRP, RSRQ, or SINR) for intra-frequency, inter-frequency, and inter-RAT mobility. For example, the measurement report message may include the measurement identity and the measurement result.

Figure 5:
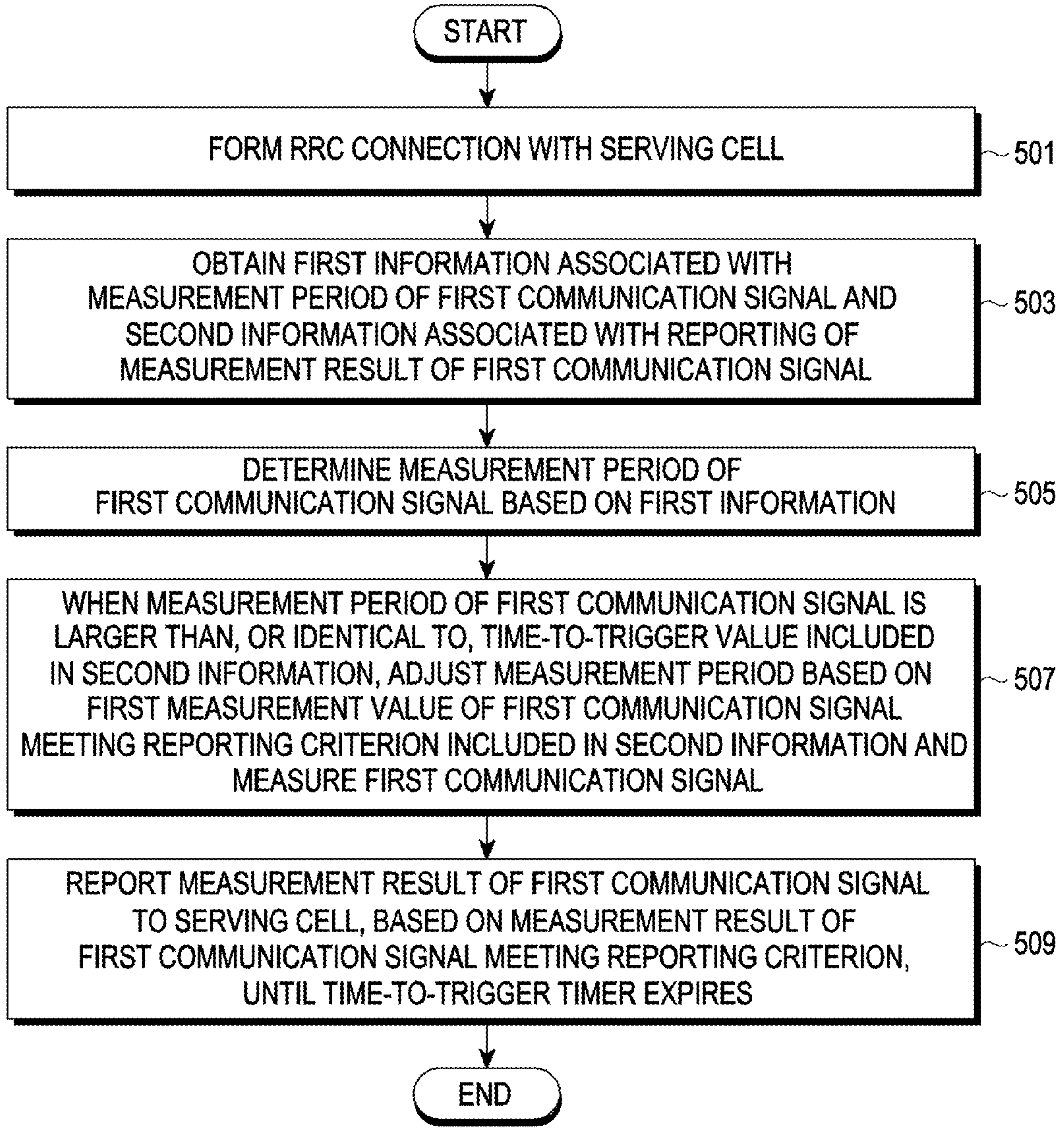
FIG. 5 illustrates a flowchart of a method of operating an electronic device according to an embodiment.
Figure 6A:
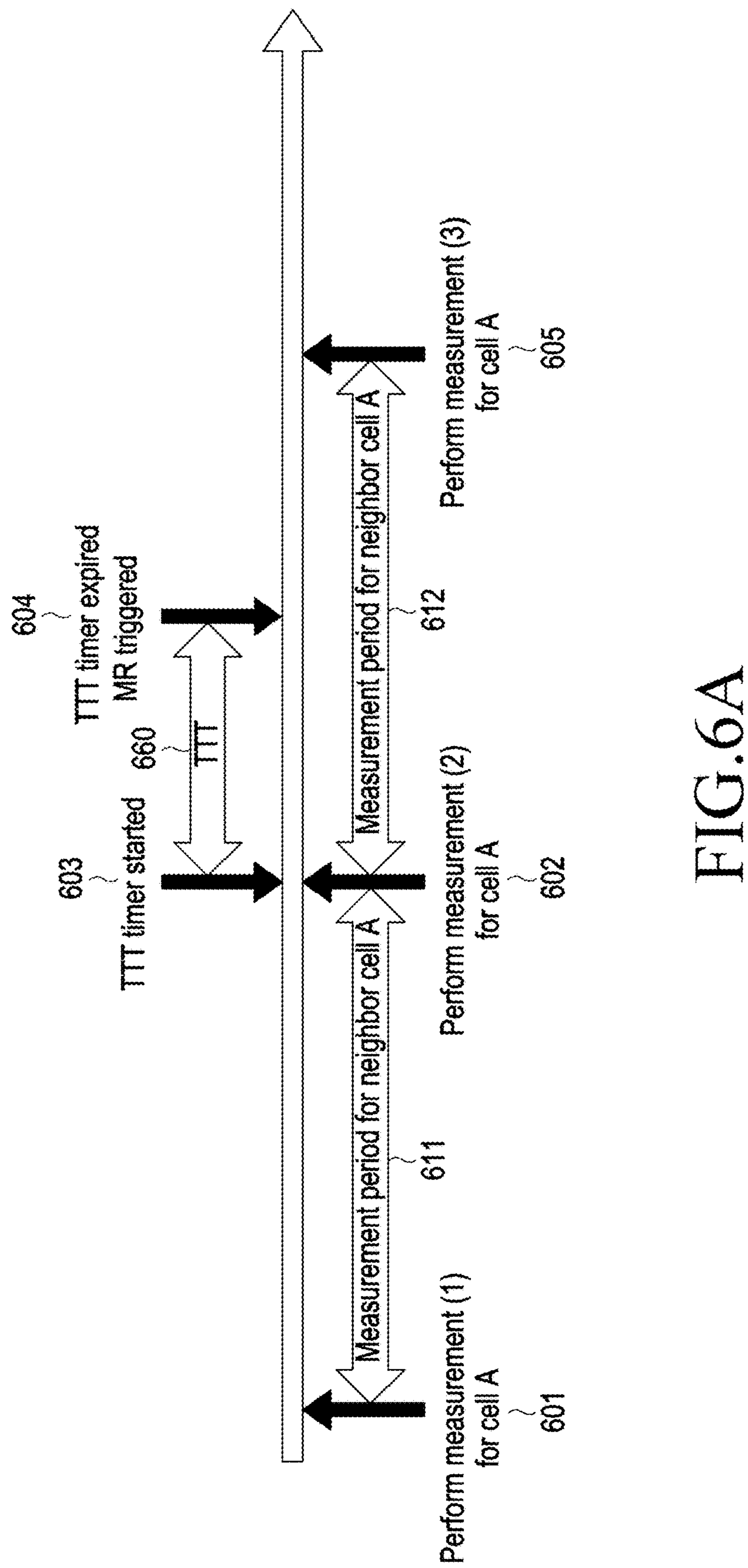
FIG. 6A illustrates a view of a reporting procedure according to a comparison example for comparison with an embodiment.
Figure 6B:
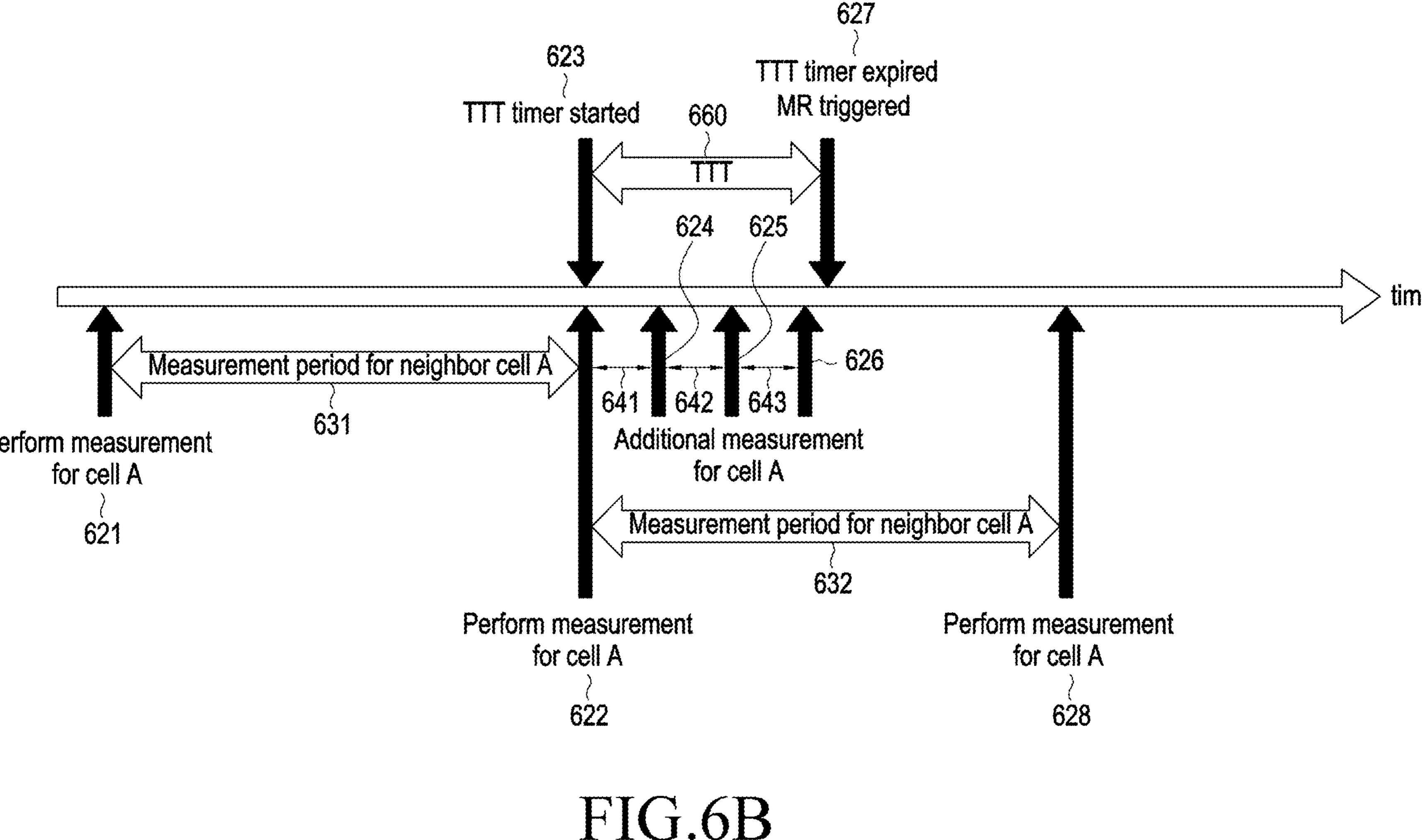
FIG. 6B illustrates a view of a reporting procedure according to an embodiment.

FIG. 5 illustrates a flowchart of a method of operating an electronic device according to an embodiment. The embodiment of FIG. 5 is described with reference to FIGS. 6A and 6B. FIG. 6A illustrates a view of a reporting procedure according to a comparison example for comparison with an embodiment. FIG. 6B illustrates a view of a reporting procedure according to an embodiment.

According to an embodiment, an electronic device 101 (e.g., at least one of the processor 120, the first communication processor 212, the second communication processor 214, the integrated communication processor 260, or the integrated SoC (not shown)) may form an RRC connection with the serving cell in operation 501. For example, the electronic device 101 may transmit an RRC connection request message to the serving cell (e.g., the network 400). In response to the RRC connection request message, the serving cell may transmit an RRC connection setup message to the electronic device 101, thereby allocating a resource for dedicated use by the electronic device 101. The electronic device 101 may perform configuration based on the configuration information included in the RRC connection setup and transmit an RRC connection setup complete message to the serving cell. The above-described process is merely an example, and no restriction is imposed on the RRC connection procedure.

According to an embodiment, in operation 503, the electronic device 101 may obtain first information associated with the measurement period of a first communication signal and second information associated with a reporting of the measurement result of the first communication signal. The first information associated with the communication signal measurement period may mean information available for the UE to determine the measurement period. The second information may be information associated with reporting, e.g., information about the above-described reporting criteria. The information about the reporting criteria may include the time-to-trigger value. Here, obtaining the first information by the electronic device 101 may include, e.g., receiving at least part of the first information from the network and/or identifying at least part of the first information stored in the electronic device 101 directly by the electronic device 101. For example, the electronic device 101 may store and use the system information and/or the information received via an RRC message and/or the prior value used. Here, obtaining the second information by the electronic device 101 may include, e.g., receiving at least part of the second information from the network. According to an embodiment, the electronic device 101 may receive a message (e.g., an RRC connection reconfiguration message or RRC reconfiguration message) including at least part of the first information and the second information, from the network and may identify at least another part of the first information from the message. In another example, the electronic device 101 may receive at least part of the first information and the second information individually via different messages. The time-to-trigger value may mean a period during which the reporting criteria (e.g., a triggering event) needs to be met to trigger measurement reporting and may be expressed as a "ms (millisecond)" number (e.g., ms0, ms40, ms64, ms80, ms100, ms128, ms160, ms256, ms320, ms480, ms512, ms640, ms1024, ms1280, ms2560, ms5120). The time-to-trigger value may be set, e.g., per reporting criterion.

According to an embodiment, in operation 505, the electronic device 101 may determine the measurement period of a first communication signal based on the first information. For example, the electronic device 101 may obtain (or identify) at least one of information about the measurement gap repetition period (MPRP), the discontinuous reception (DRX) period, the SSB-based measurement timing configuration (SMTC) period, or carrier specific scaling factor (CSSF) intra, as the first information for infra frequency measurement of FR1. At least part (e.g., DRX period, STMC period, or MGRP) of the first information may be received by the electronic device 101 from the network, and at least another part (e.g., CSSFintra) of the first information may be identified directly by the electronic device 101. For example, the electronic device 101 may identify information (e.g., CSSFintra) stored in the electronic device 101. For example, the MGRP and SMTC period may be included in measConfig, and the DRX period may be included in MAC-CellGroupConfig in cellGroupConFIG. MeasConfig may be included in the RRC connection reconfiguration message, RRC reconfiguration message, or RRCResume message. cellGroupConfig may be included in the RRC connection reconfiguration message, RRC reconfiguration message, RRCResume message, or RRCSetup message. The electronic device 101 may receive an RRC connection reconfiguration message including, e.g., the MGRP, SMTC period, DRX period, measurement condition, and time-to-trigger value. Or, the electronic device 101 may receive an RRC connection reconfiguration message or RRC reconfiguration message including at least one of the MGRP, SMTC period, DRX period, measurement condition, or time-to-trigger value and may receive the remaining information via another message.

According to an embodiment, the electronic device 101 may determine the measurement period for the infra frequency of FR1 with a gap as shown in, e.g., Table 1.

TABLE 1

| DRX cycle | $T_{SSB\_measurement\_period\_intra}$ |
|---|---|
| When DRX cycle is not set | max[ 200 ms, 5 × max(MGRP, SMTC period) ] |
| When DRX cycle is 320 ms or less | max[ 200 ms, ceil(1.5 × 5) × max(MGRP, SMTC period, DRX cycle) ] |
| When DRX cycle exceeds 320 ms | 5 × max(MGRP, DRX cycle) |

Table 1 represents the measurement period for the intra frequency of FR1 and may be determined according to, e.g., 3GPP TS 38.133. According to an embodiment, the electronic device 101 may determine that the value in Table 1 is, as it is, the measurement period or, according to an implementation, the electronic device 101 may determine that a value derived based on the value in Table 1 or a value smaller than the value in Table 1 is the measurement period. According to an embodiment, determining the measurement period based on the first information may encompass, e.g., determining the measurement period according to the scheme set forth in the 3GPP TS documents or determining the measurement period based on a value determined according to the scheme set forth in the 3GPP TS documents.

According to an embodiment, the electronic device 101 may identify a plurality of measurement periods according to, e.g., 3GPP TS 38.133, as well as the measurement period for the intra frequency of FR1 as shown in Table 1. For example, the electronic device 101 may identify the measurement period (e.g., the measurement period shown in Table 9.3.5-1 of 3GPP TS 38.133) for the inter-frequency with a gap at FR1 using at least one of the MPRP information, DRX period, SMTC period, or $CSSF_{inter}$ as the first information. For example, the electronic device 101 may identify the measurement period (e.g., the measurement period shown in Table 9.3.5-2 of 3GPP TS 38.133) for the inter-frequency with a gap at FR2 using at least one of Mmeas_period_inter, the MPRP information, DRX period, SMTC period, or $CSSF_{inter}$ as the first information. For example, the electronic device 101 may identify the measurement period (e.g., the measurement period shown in Table 9.2.5.2-1 of 3GPP TS 38.133) for the intra-frequency with a gap at FR1 using Kp, SMTC period, and DRX cycle as the first information. Kp may be set to 1, e.g., when the intra frequency STMC does not overlap the measurement gap. For example, the electronic device 101 may identify the measurement period (e.g., the measurement period shown in Table 9.2.5.2-1 of 3GPP TS 38.133) for the intra-frequency with no gap at FR1 using Kp, SMTC period, and DRX cycle as the first information. For example, the electronic device 101 may identify the measurement period (e.g., the measurement period shown in Table 9.2.5.2-2 of 3GPP TS 38.133) for the intra-frequency with no gap at FR2 using Mmeas_period_w/o_gaps, Kp, $K_{RLM}$, SMTC period, and DRX cycle as the first information. For example, the electronic device 101 may identify the measurement period (e.g., the measurement period shown in Table 9.2.5.2-3 of 3GPP TS 38.133) for the intra-frequency measurement with no gap at FR1 using meascycleSCell and DRX cycle as the first information. For example, the electronic device 101 may identify the measurement period (e.g., the measurement period shown in Table 9.2.5.2-4 of 3GPP TS 38.133) for the intra-frequency measurement with no gap at FR2 using Mmeas_period with_gaps, meascycleSCell, and DRX cycle as the first information. For example, the electronic device 101 may identify the measurement period (e.g., the measurement period shown in Table 9.2.6.3-2 of 3GPP TS 38.133) for the intra-frequency measurement with a gap at FR2 using Mmeas_period with_gaps, MGRP, SMTC period, and DRX cycle as the first information. For example, the electronic device 101 may identify the measurement period (e.g., the measurement period shown in Table 9.2.6.3-3 of 3GPP TS 38.133) for the intra-frequency measurement with no gap at FR1 using meascycleSCell and DRX cycle as the first information. For example, the electronic device 101 may identify the measurement period (e.g., the measurement period shown in Table 9.2.5.3-4 of 3GPP TS 38.133) for the intra-frequency measurement with no gap at FR2 using Mmeas_period with_gaps, meascycleSCell, and DRX cycle as the first information. Meanwhile, the above-described examples are solely for illustration purposes, and other measurement periods than those described above may be identified by the electronic device 101. It will be easily appreciated by one of ordinary skill in the art that no restriction is imposed on parameters and calculation schemes for identifying the measurement period. The above-described combinations of parameters are merely examples. According to an embodiment, the electronic device 101 may identify the measurement period based on at least one parameter (e.g., MGRP alone) among the above-described parameter combinations.

According to an embodiment, when the measurement period of the first communication signal is equal to or larger than the time-to-trigger value included in the second information, the electronic device 101 may adjust the measurement period and measure the first communication signal based on the first measurement of the first communication signal meeting the reporting criteria included in the second information, in operation 507. According to an embodiment, when the measurement period of the first communication signal is larger than the time-to-trigger value, the electronic device 101 may be configured to adjust the measurement period and measure the first communication signal based on the first measurement of the first communication signal meeting the reporting criteria included in the second information. In operation 509, the electronic device 101 may report the measurement result of the first communication signal to the serving cell based on the measurement result of the first communication signal meeting the reporting criteria while the timer corresponding to the time-to-trigger value operates (e.g., before the timer expires). According to an embodiment, unless the measurement result of the first communication signal meets the reporting criteria while the timer corresponding to the time-to-trigger value operates, the measurement result of the first communication signal may not be reported to the serving cell.

For example, referring to FIG. 6A, according to a comparison example, the electronic device 101 may be configured to measure the communication signal from a neighbor cell A. For example, the electronic device 101 may identify the measurement period for neighbor cell A 611 and 612 and identify the time-to-trigger (TTT) value 660. In the comparison example, the time-to-trigger value 660 may be set to be smaller than the measurement period 611 and 612. Thus, in the comparison example, the electronic device 101 may perform first measurement 601 on cell A and, if the measurement period 611 expires, perform second measurement 602. In FIG. 6A, it is assumed that the reporting criteria is met in the second measurement. The electronic device 101 may start (603) the time-to-trigger (TTT) timer based on meeting the reporting criteria. The electronic device 101 may include a timer implemented in software or hardware and, upon receiving the time-to-trigger information from the network, set the timer to the value corresponding to the time-to-trigger. According to an embodiment, although the use of a timer is taken as an example of a method for identifying the passage of the time-to-trigger time, it will be easily appreciated by one of ordinary skill in the art that embodiments of the disclosure are not limited thereto. In the comparison example, the electronic device 101 may wait for a reporting period 612 and may perform third measurement 605. The electronic device 101 may identify that the time-to-trigger timer expires and, based thereupon, trigger (604) measurement reporting (MR). However, the measurement result included in the measurement reporting trigger (604) may include the measurement result from the second measurement 602 (e.g., the result of the second measurement 602 and a value filtered based on the existing filtered value). Thus, the measurement result at a time earlier than the time when the measurement reporting (MR) is performed may be reported to the network, and the real-time channel state may not be reported to the network.

For example, referring to FIG. 6B, according to an embodiment, the electronic device 101 may be configured to measure the communication signal from a neighbor cell A.

For example, the electronic device 101 may identify the measurement period for neighbor cell A 631 and 632 and identify the time-to-trigger (TTT) value 660. As described above, e.g., for the intra frequency FR1, the measurement period may be identified by the electronic device 101 based on at least one of the MPRP information, DRX period, SMTC period, or $CSSF_{inter}$. Further, the time-to-trigger (TTT) value 660 may be identified based on information in the measurement configuration. According to an embodiment, the time-to-trigger value 660 may be set to be smaller than the measurement period 631 and 632. The electronic device 101 may perform first measurement 621 on cell A and, if the measurement period 631 expires, perform second measurement 622. In FIG. 6B, it is assumed that the reporting criteria is met in the second measurement. The electronic device 101 may start (623) the time-to-trigger (TTT) timer based on meeting the reporting criteria.

According to an embodiment, when the time-to-trigger value is set to be smaller than the measurement period 631 and 632, the electronic device 101 may adjust the measurement period, based on meeting the reporting criteria (or the start of the time-to-trigger timer). Referring to FIG. 6B, the electronic device 101 may perform additional measurement on cell A according to the adjusted measurement period 641, 642, and 643, based on meeting the reporting criteria (or the start of the time-to-trigger timer). The electronic device 101 may identify whether the reporting criteria remains met based on the result of the additional measurement 624, 625, and 626 until the time-to-trigger (TTT) timer expires. For example, the electronic device 101 may update the filtered measurement result $F_n$ by performing layer 3 filtering, e.g., Equation 2, on the additional measurement 624, 625, and 626. If the filtered measurement results $F_n$ keeps on meeting the reporting criteria before the time-to-trigger (TTT) timer expires, the electronic device 101 may measurement-report (MR) the latest measurement result (e.g., 626). For example, the electronic device 101 may perform measurement reporting (MR) at the time 627 when the time-to-trigger (TTT) timer expires. According to an embodiment, the electronic device 101 may update the filtered measurement result $F_n$ by performing layer 3 filtering, e.g., Equation 2, on the additional measurement 624, 625, and 626. If among the filtered measurement results $F_n$, a measurement result not meeting the reporting criteria is identified until before the time-to-trigger (TTT) timer expires, the electronic device 101 may refrain from measurement-reporting (MR) the measurement result. Meanwhile, if the measurement reporting is complete, the electronic device 101 may perform measurement 628 according to the prior-identified measurement period 632. Although FIG. 6*b* illustrates that the electronic device 101 performs measurement (628) the measurement period 632 after the time of the measurement 622, this is merely an example, and the electronic device 101 may wait for the measurement period 632 after the additional measurement 626 and then perform measurement. The electronic device 101 may maintain the adjusted measurement period and perform measurement. It will be easily appreciated by one of ordinary skill in the art that the number of times (three times) of the additional measurement 626 in FIG. 6B is merely an example. As described above, since the result of the measurement 626 performed near the expiration time 627 is used for whether the reporting criteria is met and the measurement reporting, real-time reporting of the channel environment may be possible as compared with the comparison example of FIG. 6A. As the measurement period is adjusted as set forth above, the frequency at which the electronic device 101 measures the information about the power at the reference point of the measurement object may be varied. For example, as the measurement period of intra frequency is varied, the update period of the filter value of layer 3 may be altered. For example, as the measurement period of inter frequency is varied, the period of occurrence of the operation of measuring the power at the reference point for the inter frequency band may be altered and/or the update period of the filter value of layer 3 may be changed. For example, as the measurement period of inter RAT is varied, the period of occurrence of the operation of measuring the power at the RAT antenna port may be altered and/or the update period of the filter value of layer 3 may be changed.

Figure 7:
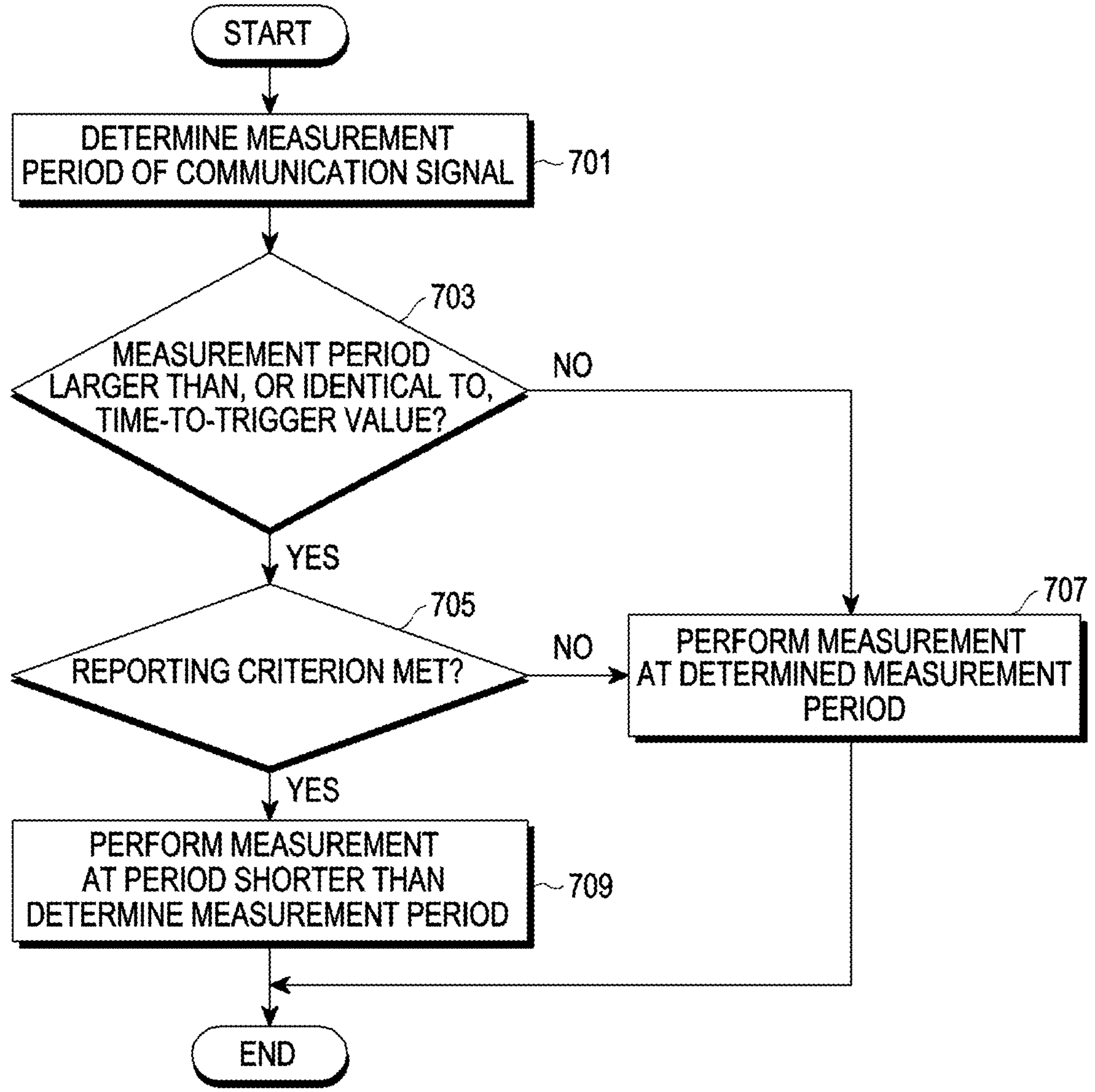
FIG. 7 illustrates a flowchart of a method for operating an electronic device according to an embodiment.

FIG. 7 illustrates a flowchart of a method for operating an electronic device according to an embodiment.

According to an embodiment, an electronic device 101 (e.g., at least one of the processor 120, the first communication processor 212, the second communication processor 214, the integrated communication processor 260, or the integrated SoC (not shown)) may determine a period of measurement of a communication signal from a specific cell (or at a specific frequency) in operation 701. As described above, e.g., for the intra frequency FR1, the electronic device 101 may determine the measurement period based on at least one of the MPRP information, DRX period, SMTC period, or $CSSF_{inter}$. In operation 703, the electronic device 101 may identify whether the measurement period is identical to (or larger than) the time-to-trigger value. When the measurement period is identical to (or larger than) the time-to-trigger value (yes in 703), the electronic device 101 may identify whether the reporting criteria is met in operation 705. When the measurement period is smaller than (or identical to or smaller than) the time-to-trigger value (no in 703), the electronic device 101 may perform measurement at the measurement period determined in operation 707. Thereafter, the electronic device 101 may determine whether the reporting criteria is met.

According to an embodiment, when the reporting criteria is met (yes in 705), the electronic device 101 may perform measurement at a period shorter than the determined measurement period in operation 709. For example, as shown in FIG. 6B, the electronic device 101 may change the measurement period 631 to an adjusted measurement period 641 and perform measurement. In one example, when the measurement period is identical to or larger than the time-to-trigger value, the electronic device 101 may adjust the measurement period to a default value based on the reporting criteria being met. In one example, when the measurement period is identical to or larger than the time-to-trigger value, the electronic device 101 may adjust the measurement period considering the time-to-trigger value, based on the reporting criteria being met. For example, the electronic device 101 may store correlation information between a plurality of time-to-trigger values and the adjusted measurement period and identify and adjust the measurement period corresponding to the identified time-to-trigger value. For example, the adjusted measurement period may be set to perform measurement at least one time before the time-to-trigger timer expires. Meanwhile, unless the reporting criteria is met (no in 705), the electronic device 101 may perform measurement at the determined measurement period.

Figure 8:
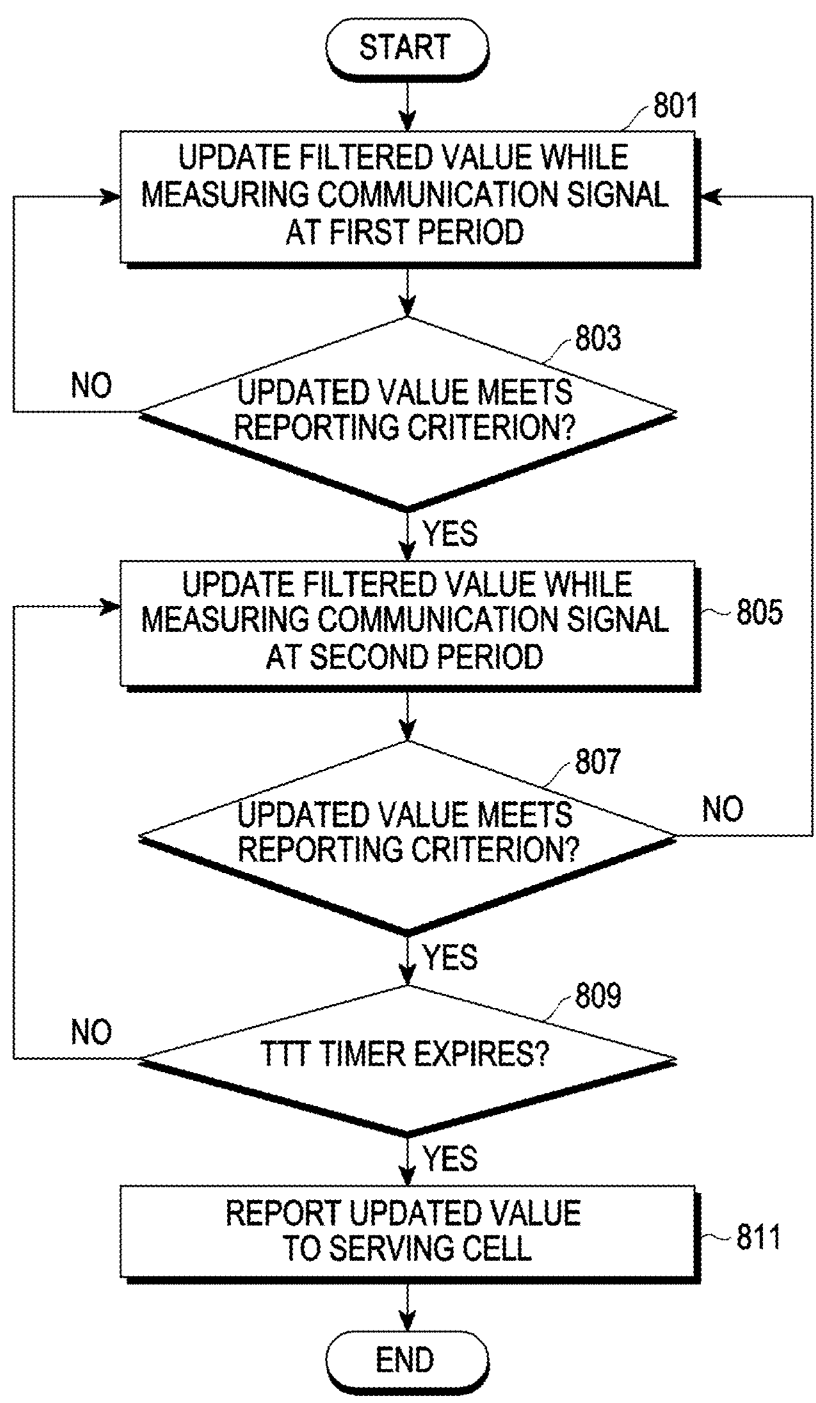
FIG. 8 illustrates a flowchart of a method for operating an electronic device according to an embodiment of the disclosure.

FIG. 8 illustrates a flowchart of a method for operating an electronic device according to an embodiment of the disclosure.

According to an embodiment, an electronic device 101 (e.g., at least one of the processor 120, the first communication processor 212, the second communication processor 214, filtered value while measuring a communication signal at a first period in operation 801. For example, the electronic device 101 may apply the measurement result from the physical layer to layer 3 filtering of Equation 2 and may thus update the filtered value. In operation 803, the electronic device 101 may determine whether the updated value meets reporting criteria. Unless the updated value meets the reporting criteria (no in 803), the electronic device 101 may update the filtered value while measuring the communication signal at the first period.

According to an embodiment, if the updated value meets the reporting criteria (yes in 803), the electronic device 101 may update the filtered value while measuring the communication signal at a second period in operation 805. The electronic device 101 may start the time-to-trigger timer based on meeting the reporting criteria. For example, the second period may be shorter than the first period, but embodiments of the disclosure are not limited thereto. In operation 807, the electronic device 101 may determine whether the updated value meets reporting criteria. Unless the updated value meets the reporting criteria (no in 807), the electronic device 101 may again update the filtered value while measuring the communication signal at the first period. When the updated value meets the reporting criteria (yes in 807), the electronic device 101 may determine whether the time-to-trigger timer expires. Before the time-to-trigger timer expires (no in 809), the electronic device 101 may update the filtered value while measuring the communication signal at the second period. If the time-to-trigger timer expires (yes in 809), the electronic device 101 may report the updated value to the serving cell in operation 811.

Figure 9:
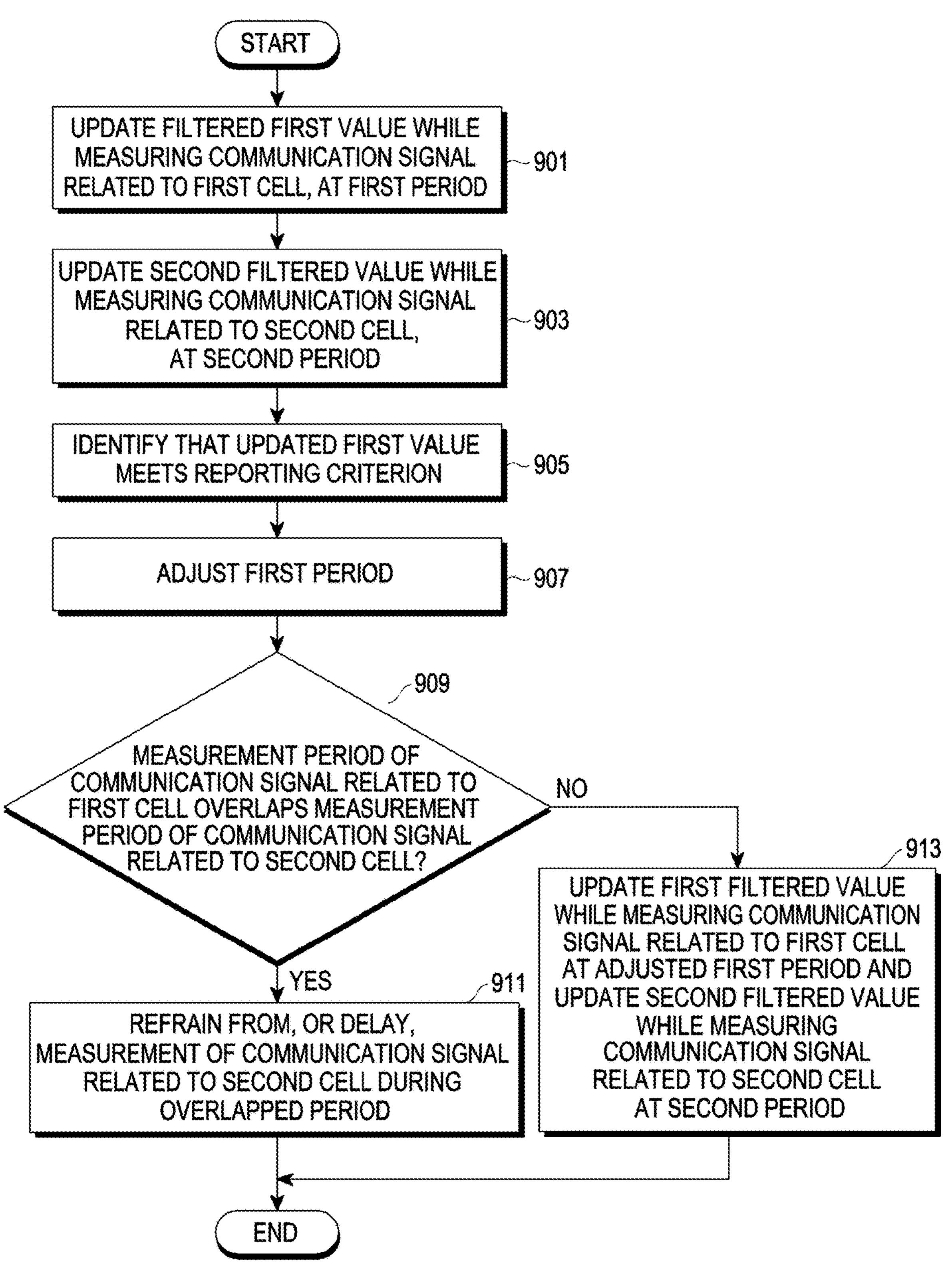
FIG. 9 illustrates a flowchart of a method for operating an electronic device according to an embodiment of the disclosure.

FIG. 9 illustrates a flowchart of a method for operating an electronic device according to an embodiment.

According to an embodiment, an electronic device 101 (e.g., at least one of the processor 120, the first communication processor 212, the second communication processor 214, filtered value while measuring a communication signal related to a first cell (or a first frequency) at a first period in operation 901. In operation 903, the electronic device 101 may update the filtered second value while measuring the communication signal related to a second cell (or a second frequency) at a second period. The first period and the second period may be set to differ from each other but, according to an implementation, they may be the same. In operation 905, the electronic device 101 may identify whether the updated first value meets the reporting criteria. In operation 907, the electronic device 101 may adjust the first period. Further, the electronic device 101 may start the time-to-trigger timer for the first cell. Meanwhile, the electronic device 101 may maintain the existing measurement period, i.e., the second period, for the second cell. According to an embodiment, the electronic device 101 may adjust the measurement period only for met reporting criteria among the plurality of reporting criteria while maintaining the measurement period for unmet reporting criteria.

According to an embodiment, in operation 909, the electronic device 101 may determine whether the measurement period of the communication signal related to the first cell overlaps the measurement period of the communication signal related to the second cell. If the measurement periods overlap (yes in 909), the electronic device 101 may refrain from, or delay, measurement of the communication signal related to the second cell during the overlapped period and may thus measure the communication signal related to the first cell in operation 911. For example, the electronic device 101 may perform measurement, with a weight given to the measurement for the first cell meeting the reporting criteria, and may refrain from, or delay, measurement for the second cell which does not meet the reporting criteria. Unless the measurement periods overlap each other (no in 909), the electronic device 101 may update the filtered first value while measuring the communication signal related to the first cell at the adjusted first period and update the filtered second value while measuring the communication signal related to the second cell at the second period in operation 913.

Figure 10:
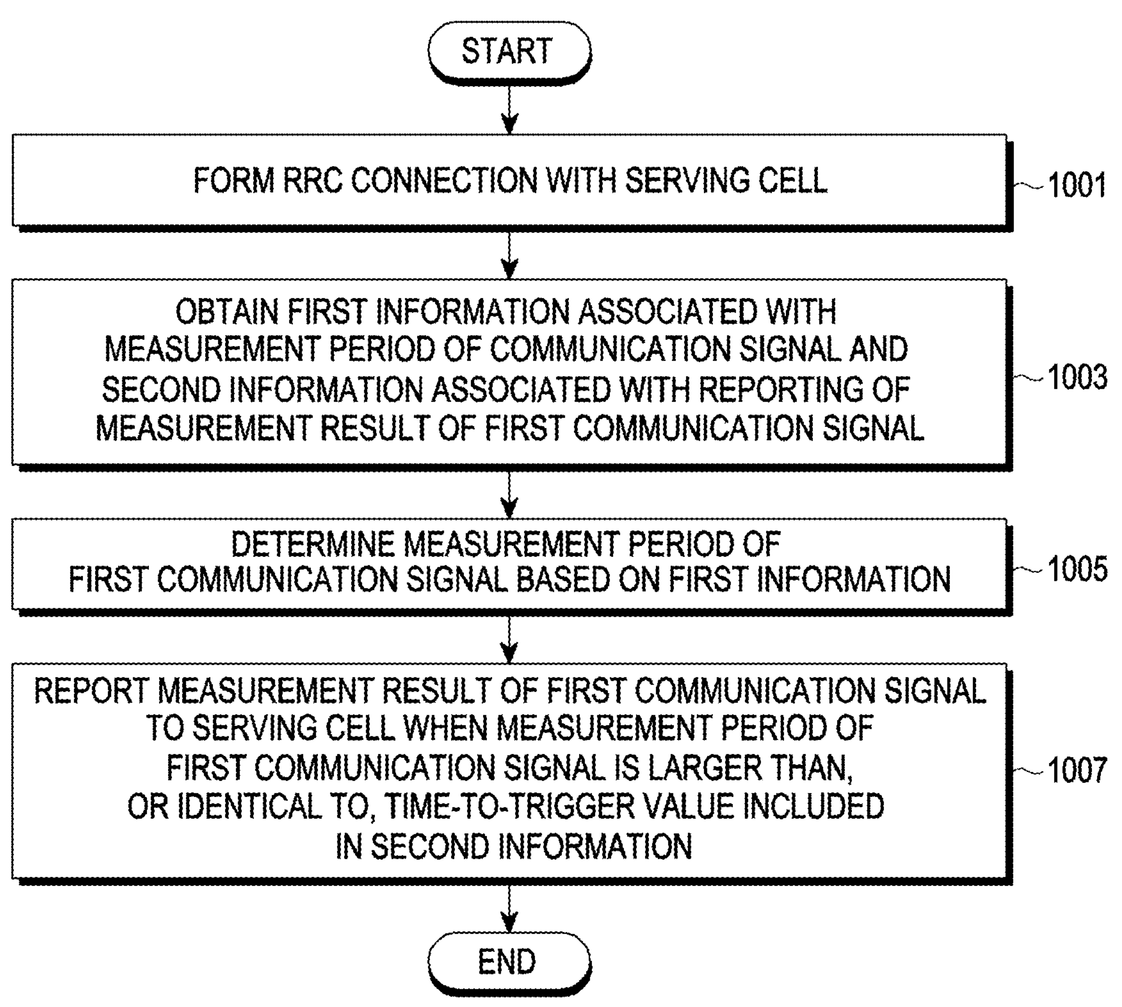
FIG. 10 illustrates a flowchart of a method for operating an electronic device according to an embodiment.
Figure 11:
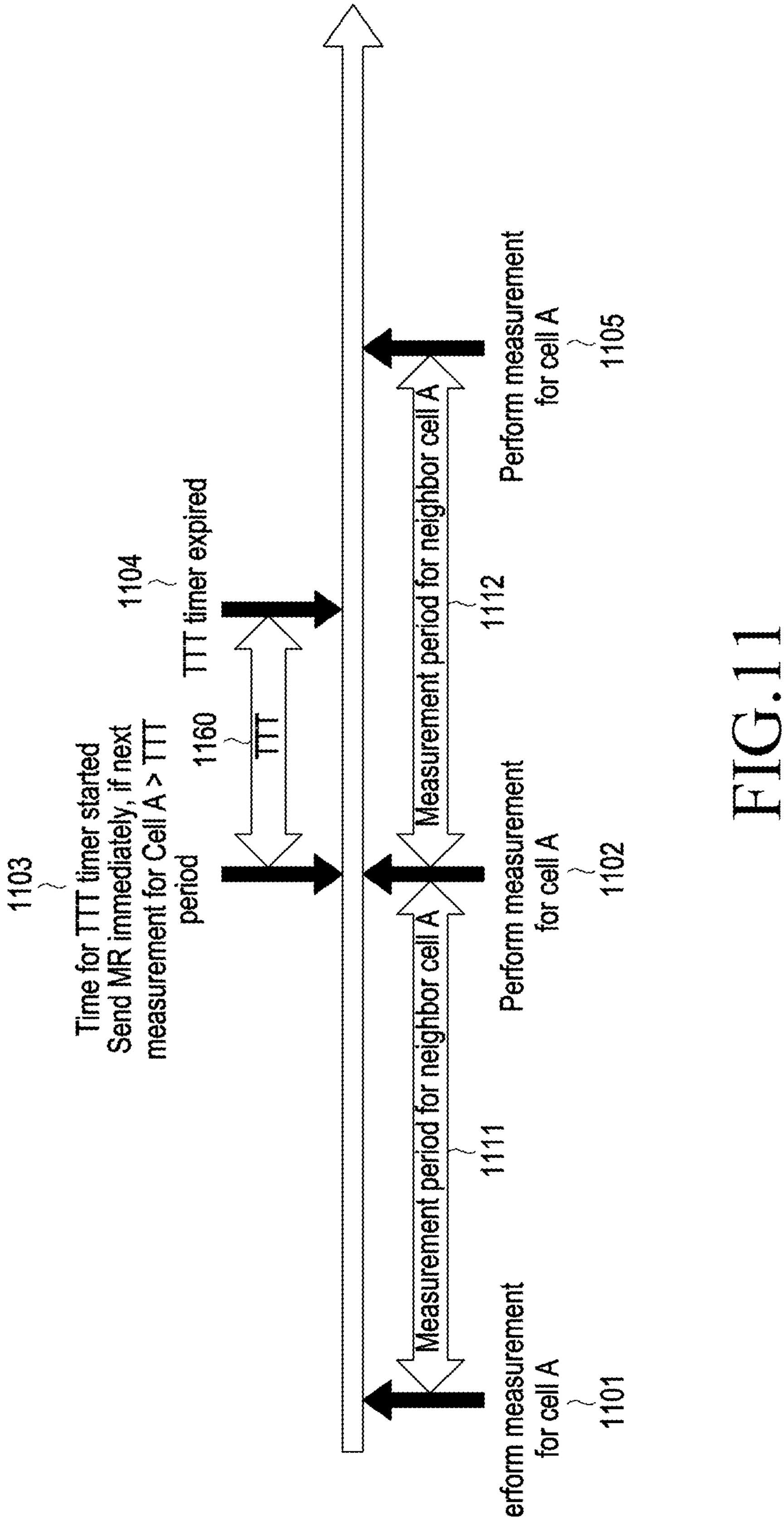
FIG. 11 illustrates a view of a reporting procedure according to an embodiment.

FIG. 10 illustrates a flowchart of a method for operating an electronic device according to an embodiment. The embodiment of FIG. 10 is described with reference to FIG. 11. FIG. 11 illustrates a view of a reporting procedure according to an embodiment.

According to an embodiment, an electronic device 101 (e.g., at least one of the processor 120, the first communication processor 212, the second communication processor 214, the integrated communication processor 260, or the integrated SoC (not shown)) may form an RRC connection with the serving cell in operation 1001. The formation of an RRC connection has been described above in detail in connection with operation 501 of FIG. 5, and no further detailed description thereof is given below. In operation 1003, the electronic device 101 may obtain first information associated with the measurement period of a first communication signal and second information associated with a reporting of the measurement result of the first communication signal. For example, for the intra frequency FR1, the electronic device 101 may obtain at least one of the MPRP information, DRX period, SMTC period, or $CSSF_{inter}$ as the first information. For example, the electronic device 101 may obtain the second information including a reporting criterion and a time-to-trigger value corresponding thereto. In operation 1005, the electronic device 101 may determine the measurement period of a first communication signal based on the first information. For example, the electronic device 101 may determine the measurement period for the intra frequency of FR1 based on at least one of the obtained MPRP information, DRX period, SMTC period, or $CSSF_{inter}$. For example, the electronic device 101 may determine the measurement period 1111 and 1112 for cell A in FIG. 11.

According to an embodiment, if the measurement period of the first communication signal is equal to or larger than the time-to-trigger value 1160 included in the second information, the electronic device 101 may report the measurement result for the first communication signal to the serving cell based on meeting the reporting criteria in operation 1007. For example, referring to FIG. 11, the electronic device 101 may perform measurement (1101) on cell A. The result of the measurement 1101 is assumed not to meet the reporting criteria corresponding to cell A. After waiting for the measurement period 1111, the electronic device 101 may again perform measurement 1102. The result of the measurement 1102 is assumed to meet the reporting criteria. If the measurement period is identical to or larger than (or simply larger than) the time-to-trigger value 1160, the electronic device 101 may immediately perform measurement reporting (MR) 1103 based on meeting the reporting criteria. For example, the electronic device 101 may perform measurement reporting 1103 at the time of the measurement 1102 meeting the reporting criteria. If the measurement period is identical to or larger than (or simply larger than) the time-to-trigger value, the electronic device 101 may perform measurement reporting (MR) 1103 within a predetermined time (e.g., from a few us to a few hundreds of us) based on meeting the reporting criteria. For example, the electronic device 101 may perform the measurement reporting 1103 within a predetermined time of the time of the measurement 1102 meeting the reporting criteria. According to an embodiment, if the measurement period is equal to or larger than (or simply larger than) the time-to-trigger value, the electronic device 101 may disregard the time-to-trigger. For example, the electronic device 101 may not start the time-to-trigger timer or, although it starts the time-to-trigger timer and the timer expires, may refrain from performing measurement reporting at that time. Thus, the electronic device 101 may perform the measurement reporting reflecting the current channel state.

According to an embodiment, the electronic device 101 may start (1103) the time-to-trigger timer and terminate (1104) the time-to-trigger timer. According to an implementation, if the measurement period is identical to or larger than (or just larger than) the time-to-trigger value, the electronic device 101 may not start the time-to-trigger timer. For example, the electronic device 101 may wait for the measurement period 1112 regardless of the expiration of the time-to-trigger timer and then resume the measurement 1105 on cell A.

If the measurement period is set to be shorter than the time-to-trigger value, the electronic device 101 may perform measurement at least one or more times according to the prior measurement period before the time-to-trigger timer expires. If all such measurement meets the reporting criteria, e.g., if the reporting criteria remains met before the time-to-trigger timer expires, the electronic device 101 may perform measurement reporting.

According to an embodiment, an electronic device (e.g., the electronic device 101) comprises at least one processor (e.g., at least one of the processor 120, the first communication processor 212, the second communication processor 214, the integrated communication processor 260, or the integrated SoC (not shown)) configured to support at least one communication scheme and at least one antenna configured to transmit or receive at least one communication signal associated with the at least one communication scheme. The at least one processor (e.g., at least one of the processor 120, the first communication processor 212, the second communication processor 214, the integrated communication processor 260, or the integrated SoC (not shown)) may be configured to form a connection with a serving cell, obtain first information associated with a measurement period of a first communication signal received via at least some of the at least one antenna, wherein the first communication signal is associated with a first communication scheme among the at least one communication scheme, obtain second information associated with reporting a measurement result of the first communication signal, determine the measurement period of the first communication signal based on the first information, when the determined measurement period is larger than, or identical to, a time-to-trigger value included in the second information, adjust the determined measurement period, based on a first measurement value for the first communication signal meeting at least one reporting criterion included in the second information, and measure the first communication signal based on the adjusted measurement period while a timer corresponding to the time-to-trigger value operates, and report the measurement result of the first communication signal to the serving cell, based on the at least one reporting criterion being met by at least one measurement value for the first communication signal measured according to the adjusted measurement period, until the timer corresponding to the time-to-trigger value expires.

According to an embodiment, the at least one processor (e.g., at least one of the processor 120, the first communication processor 212, the second communication processor 214, the integrated communication processor 260, or the integrated SoC (not shown)) may be configured to, after reporting the measurement result of the first communication signal to the serving cell, change the adjusted measurement period back to the measurement period determined based on the first information.

According to an embodiment, at least part of the first measurement value or the at least one measurement value may be a value filtered based on a measurement value obtained before the at least part of the first measurement value or the at least one measurement value is obtained.

According to an embodiment, the at least one processor (e.g., at least one of the processor 120, the first communication processor 212, the second communication processor 214, the integrated communication processor 260, or the integrated SoC (not shown)) may be configured to, as part of adjusting the determined measurement period, based on the first measurement value meeting at least one reporting criterion included in the second information, when the measurement period is larger than, or identical to, the time-to-trigger value included in the second information and measuring the first communication signal based on the adjusted measurement period while the timer corresponding to the time-to-trigger value operates, adjust the measurement period to be shorter than before the at least one reporting criterion is met and measure the first communication signal at least one time before the timer corresponding to the time-to-trigger value expires, according to the adjusted measurement period.

According to an embodiment, the first communication signal may be a communication signal corresponding to any one of an inter frequency, intra frequency, or inter-RAT of the serving cell.

According to an embodiment, the first communication signal may be at least one of a reference signal or a synchronization signal transmitted from at least one neighbor cell of the serving cell.

According to an embodiment, the at least one processor (e.g., at least one of the processor 120, the first communication processor 212, the second communication processor 214, the integrated communication processor 260, or the integrated SoC (not shown)) may be configured to receive an RRC connection reconfiguration message including the second information including the at least one reporting criteria and the time-to-trigger value, from the serving cell.

According to an embodiment, the at least one processor (e.g., at least one of the processor 120, the first communication processor 212, the second communication processor 214, the integrated communication processor 260, or the integrated SoC (not shown)) may be configured to, as part of obtaining the first information, identify at least part of the first information from a RRC connection reconfiguration message and identify the rest of the first information from another message transmitted from the serving cell or based on information configured in the electronic device (e.g., the electronic device 101).

According to an embodiment, the at least one processor (e.g., at least one of the processor 120, the first communication processor 212, the second communication processor 214, the integrated communication processor 260, or the integrated SoC (not shown)) may be configured to, when a measurement period of a second communication signal from a second neighbor cell different from a first neighbor cell associated with the first communication signal overlaps the measurement period of the first communication signal according to the adjusted measurement period, refrain from, or delay, measurement of the second communication signal.

According to an embodiment, a method for operating an electronic device (e.g., the electronic device 101) comprising at least one processor (e.g., at least one of the processor 120, the first communication processor 212, the second communication processor 214, the integrated communication processor 260, or the integrated SoC (not shown)) configured to support at least one communication scheme and at least one antenna configured to transmit or receive at least one communication signal associated with the at least one communication scheme comprises forming a connection with a serving cell, obtaining first information associated with a measurement period of a first communication signal received via at least some of the at least one antenna, wherein the first communication signal is associated with a first communication scheme among the at least one communication scheme, obtaining second information associated with reporting a measurement result of the first communication signal, determining the measurement period of the first communication signal based on the first information, when the determined measurement period is larger than, or identical to, a time-to-trigger value included in the second information, adjusting the determined measurement period, based on a first measurement value for the first communication signal meeting at least one reporting criterion included in the second information, and measuring the first communication signal based on the adjusted measurement period while a timer corresponding to the time-to-trigger value operates, and reporting the result of the measurement of the first communication signal to the serving cell, based on the at least one reporting criterion being met by at least one measurement value for the first communication signal measured according to the adjusted measurement period, until the timer corresponding to the time-to-trigger value expires.

According to an embodiment, the method may further comprise, after reporting the measurement result of the first communication signal to the serving cell, changing the adjusted measurement period back to the measurement period determined based on the first information.

According to an embodiment, at least part of the first measurement value or the at least one measurement value may be a value filtered based on a measurement value obtained before the at least part of the first measurement value or the at least one measurement value is obtained.

According to an embodiment, adjusting the measurement period, based on the first measurement value meeting at least one reporting criterion included in the second information, when the measurement period is larger than, or identical to, the time-to-trigger value included in the second information and measuring the first communication signal based on the adjusted measurement period while the timer corresponding to the time-to-trigger value operates may comprises adjusting the measurement period to be shorter than before the at least one reporting criterion is met, and measuring the first communication signal at least one time before the timer corresponding to the time-to-trigger value expires, according to the adjusted measurement period.

According to an embodiment, the first communication signal may be a communication signal corresponding to any one of an inter frequency, intra frequency, or inter-RAT of the serving cell.

According to an embodiment, the first communication signal may be at least one of a reference signal or a synchronization signal transmitted from at least one neighbor cell of the serving cell.

According to an embodiment, the method may further comprise receiving an RRC connection reconfiguration message including the second information including the at least one reporting criterion and the time-to-trigger value, from the serving cell.

According to an embodiment, obtaining the first information may comprise identifying at least part of the first information from a RRC connection reconfiguration message and identifying the rest of the first information from another message transmitted from the serving cell or based on information configured in the electronic device (e.g., the electronic device 101).

According to an embodiment, the method may further comprise, when a measurement period of a second communication signal from a second neighbor cell different from a first neighbor cell associated with the first communication signal overlaps the measurement period of the first communication signal according to the adjusted measurement period, refraining from, or delaying, measurement of the second communication signal.

According to an embodiment, an electronic device comprises at least one processor (e.g., at least one of the processor 120, the first communication processor 212, the second communication processor 214, the integrated communication processor 260, or the integrated SoC (not shown)) configured to support at least one communication scheme; and at least one antenna configured to transmit or receive at least one communication signal associated with the at least one communication scheme. The at least one processor (e.g., at least one of the processor 120, the first communication processor 212, the second communication processor 214, the integrated communication processor 260, or the integrated SoC (not shown)) is configured to form a connection with a serving cell, obtain first information associated with a measurement period of a first communication signal received via at least some of the at least one antenna, wherein the first communication signal is associated with a first communication scheme among the at least one communication scheme, obtain second information associated with reporting a measurement result of the first communication signal, determine the measurement period of the first communication signal based on the first information, when the determined measurement period is larger than, or identical to, a time-to-trigger value included in the second information, based on a first measurement value for the first communication signal meeting at least one reporting criterion included in the second information, report a measurement result of the first communication signal based on the first measurement value to the serving cell.

According to an embodiment, the at least one processor (e.g., at least one of the processor 120, the first communication processor 212, the second communication processor 214, the integrated communication processor 260, or the integrated SoC (not shown)) may be configured to, when the measurement period is shorter than the time-to-trigger value included in the second information, measure the first communication signal based on the measurement period while a timer corresponding to the time-to-trigger value operates, and report a result of the measurement of the first communication signal to the serving cell, based on the at least one reporting criterion being met by at least one measurement value for the first communication signal measured according to the measurement period, until the timer corresponding to the time-to-trigger value expires.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be provided an electronic device and method for operating the electronic device may immediately report the result of measurement or adjust the period of measurement as the reporting criterion is met when the measurement period is identical to or longer than the time-to-trigger value. This enables a real-time reporting of the channel environment. By performing the measurement reporting precisely reflecting the current channel state, it is possible to increase the hand-over success rate or to maintain a good channel state.

Although the present disclosure has been described with various embodiments, various changes and modifications may be suggested to one skilled in the art. It is intended that the present disclosure encompass such changes and modifications as fall within the scope of the appended claims.

What is claimed is:

1. A communication processor chip for a user equipment (UE), comprising:

at least one processor; and a memory storing instructions which, when executed by the at least one processor, cause the communication processor chip to:

establish a connection with a serving cell associated with a long-term evolution (LTE) communication provided by an LTE base station;

identify a measurement period of a first communication signal associated with a new radio (NR) communication;

obtain, from the LTE base station, a report condition for reporting a measurement result of the first communication signal and a time-to-trigger value, wherein the time-to-trigger value indicates a time period during which the report condition needs to be met in order to report the measurement result;

periodically measure a signal strength of the first communication signal according to the measurement period and identify whether the signal strength of the first communication signal satisfies the report condition or not;

start a time-to-trigger timer corresponding to the time-to-trigger value based on a first measurement value associated with the signal strength of the first communication signal satisfying the report condition;

in case that the first measurement value satisfies the report condition, and the measurement period is larger than a remaining time corresponding to the time-to-trigger value, report a measurement result corresponding to the first measurement value to the serving cell before expiration of the remaining time corresponding to the time-to-trigger value; and in case that the measurement period is smaller than or equal to the remaining time corresponding to the time-to-trigger value, after the expiration of the remaining time corresponding to the time-to-trigger value, report a measurement result.

2. The communication processor chip of claim 1, wherein the instructions, when executed by at least one processor, cause the communication processor chip to:

report the measurement result corresponding to the signal strength of the first communication signal to the serving cell within a predetermined period after the first measurement value for the measured first communication signal meets the at least one reporting condition.

3. The communication processor chip of claim 1, wherein the measurement result corresponding to the signal strength of the first communication signal includes at least one of: a reference signal received power (RSRP), a reference signal received quality (RSRQ), a received signal strength indicator (RSSI), or a signal to interference plus noise ratio (SINR) of the first communication signal.

4. The communication processor chip of claim 1, wherein the instructions, when executed by at least one processor, cause the communication processor chip to:

receive, from the LTE base station, a radio resource control (RRC) reconfiguration message.

5. The communication processor chip of claim 1, wherein the instructions, when executed by at least one processor, cause the communication processor chip to:

based on the measurement period being smaller than or equal to the remaining time corresponding to the time-to-trigger value:

measure at least one first communication signal based on the measurement period before the expiration of the remaining time corresponding to the time-to-trigger value, and based on the expiration of the remaining time corresponding to the time-to-trigger value and at least one reporting condition being met by at least one measurement value for the measured at least one first communication signal, report a measurement result of the at least one first communication signal.

6. A user equipment (UE), comprising:

a communication circuitry configured to perform a long-term evolution (LTE) communication and a new radio (NR) communication; and at least one processor configured to:

establish, a connection with a serving cell associated with a long-term evolution (LTE) communication provided by an LTE base station;

identify a measurement period of a first communication signal associated with the NR communication;

obtain, from the LTE base station, a report condition for reporting a measurement result of the first communication signal and a time-to-trigger value, wherein the time-to-trigger value indicates a time period during which the report condition needs to be met in order to report the measurement result;

periodically measure, a signal strength of the first communication signal according to the measurement period and identify whether the signal strength of the first communication signal satisfies the report condition or not;

start a time-to-trigger timer corresponding to the time-to-trigger value based on a first measurement value associated with the signal strength of the first communication signal satisfying the report condition;

in case that the first measurement value satisfies the report condition, and the measurement period is larger than a remaining time corresponding to the time-to-trigger value, report a measurement result corresponding to the first measurement value to the serving cell before expiration of the remaining time corresponding to the time-to-trigger value; and in case that the measurement period is smaller than or equal to the remaining time corresponding to the time-to-trigger value, after the expiration of the remaining time corresponding to the time-to-trigger value, report a measurement result.

7. The UE of claim 6, wherein the at least one processor is configured to report the measurement result corresponding to the signal strength of the first communication signal to the serving cell within a predetermined period after the first measurement value for the measured first communication signal meets the at least one reporting condition.

8. The UE of claim 6, wherein the measurement result corresponding to the signal strength of the first communication signal includes at least one of: a reference signal received power (RSRP), a reference signal received quality (RSRQ), a received signal strength indicator (RSSI) or a signal to interference plus noise ratio (SINR) of the first communication signal.

9. The UE of claim 6, wherein the at least one processor is further configured to:

receive, from the LTE base station, a radio resource control (RRC) reconfiguration message.

10. The UE of claim 6, wherein the at least one processor is configured to:

based on the measurement period being smaller than or equal to the remaining time corresponding to the time-to-trigger value:

measure at least one first communication signal based on the measurement period before the expiration of the remaining time corresponding to the time-to-trigger value, and based on the expiration of the remaining time corresponding to the time-to-trigger value and at least one reporting condition being met by at least one measurement value for the measured at least one first communication signal, report a measurement result of the at least one first communication signal to the serving cell.

11. A method of controlling a user equipment (UE), comprising:

establishing, by a communication processor of the UE, a connection with a serving cell associated with a long-term evolution (LTE) communication provided by an LTE base station;

identifying a measurement period of a first communication signal associated with a new radio (NR) communication;

obtaining, from the LTE base station, a report condition for reporting a measurement result of the first communication signal and a time-to-trigger value, wherein the time-to-trigger value indicates a time period during which the report condition needs to be met in order to report the measurement result;

periodically measuring a signal strength of the first communication signal according to the measurement period and identify whether the signal strength of the first communication signal satisfies the report condition or not;

starting a time-to-trigger timer corresponding to the time-to-trigger value based on a first measurement value associated with the signal strength of the first communication signal satisfying the report condition;

in case that the first measurement value satisfies the report condition, and the measurement period is larger than a remaining time corresponding to the time-to-trigger value, reporting a measurement result corresponding to the first measurement value to the serving cell before expiration of the remaining time corresponding to the time-to-trigger value; and in case that the measurement period is smaller than or equal to the remaining time corresponding to the time-to-trigger value, after the expiration of the remaining time corresponding to the time-to-trigger value, reporting a measurement result.

12. The method of claim 11, wherein the reporting of the measurement result corresponding to the signal strength of the first communication signal to the serving cell before the expiration of the remaining time corresponding to the time-to-trigger value comprises reporting the measurement result corresponding to the signal strength of the first communication signal to the serving cell within a predetermined period after the first measurement value for the measured first communication signal meets the at least one reporting condition.

13. The method of claim 11, further comprising receiving, from the LTE base station, a radio resource control (RRC) reconfiguration message.

14. The method of claim 11, wherein:

based on the measurement period being smaller than or equal to the remaining time corresponding to the time-to-trigger value:

measuring, by the communication processor, at least one first communication signal based on the measurement period before the expiration of the remaining time corresponding to the time-to-trigger value; and based on the expiration of the remaining time corresponding to the time-to-trigger value and at least one reporting criteria being met by at least one measurement value for the measured at least one first communication signal, reporting a measurement result of the at least one first communication signal to the serving cell.

* * * * *